US010438400B2

(12) United States Patent
Patney et al.

(10) Patent No.: US 10,438,400 B2
(45) Date of Patent: Oct. 8, 2019

(54) PERCEPTUALLY-BASED FOVEATED RENDERING USING A CONTRAST-ENHANCING FILTER

(71) Applicant: NVIDIA Corporation, Santa Clara, CA (US)

(72) Inventors: Anjul Patney, Kirkland, WA (US); Marco Salvi, Kirkland, WA (US); Joohwan Kim, Berkeley, CA (US); Anton S. Kaplanyan, Kirkland, WA (US); Christopher Ryan Wyman, Redmond, WA (US); Nir Benty, Redmond, WA (US); David Patrick Luebke, Charlottesville, VA (US); Aaron Eliot Lefohn, Kirkland, WA (US)

(73) Assignee: NVIDIA Corporation, Santa Clara, CA (US)

( * ) Notice: Subject to any disclaimer, the term of this patent is extended or adjusted under 35 U.S.C. 154(b) by 48 days.

(21) Appl. No.: 15/453,822

(22) Filed: Mar. 8, 2017

(65) Prior Publication Data
US 2017/0263046 A1 Sep. 14, 2017

Related U.S. Application Data

(60) Provisional application No. 62/366,554, filed on Jul. 25, 2016, provisional application No. 62/305,452, filed on Mar. 8, 2016.

(51) Int. Cl.
G06T 15/20 (2011.01)
G06F 3/01 (2006.01)
(Continued)

(52) U.S. Cl.
CPC ............. *G06T 15/20* (2013.01); *G06F 3/013* (2013.01); *G06K 9/40* (2013.01); *G02B 27/017* (2013.01); *G06T 2210/36* (2013.01)

(58) Field of Classification Search
CPC ...................................... G06T 15/20
(Continued)

(56) References Cited

U.S. PATENT DOCUMENTS 9,210,391 B1* 12/2015 Mills .................. H04N 9/07
2006/0164517 A1* 7/2006 Lefebure ............. G06K 9/228
348/222.1
(Continued)

OTHER PUBLICATIONS

Wang et al., "Aliased Frequencies Enable the Discrimination of Compound Gratings in Peripheral Vision," Vision Research, vol. 37, No. 3, 1997, pp. 283-290.
(Continued)

Primary Examiner — Hai Tao Sun
(74) Attorney, Agent, or Firm — Leydig, Voit & Mayer, Ltd.

(57) ABSTRACT

A method, computer readable medium, and system are disclosed for rendering images utilizing a foveated rendering algorithm with post-process filtering to enhance a contrast of the foveated image. The method includes the step of receiving a three-dimensional scene, rendering the 3D scene according to a foveated rendering algorithm to generate a foveated image, and filtering the foveated image using a contrast-enhancing filter to generate a filtered foveated image. The foveated rendering algorithm may incorporate aspects of coarse pixel shading, mipmapped texture maps, linear efficient anti-aliased normal maps, exponential variance shadow maps, and specular anti-aliasing techniques. The foveated rendering algorithm may also be combined with temporal anti-aliasing techniques to further reduce artifacts in the foveated image.

20 Claims, 15 Drawing Sheets

(51) Int. Cl.
*G06K 9/40* (2006.01)
*G02B 27/01* (2006.01)

(58) Field of Classification Search
USPC .......................................................... 345/426
See application file for complete search history.

(56) References Cited

U.S. PATENT DOCUMENTS

| | | | | |
|---|---|---|---|---|
| 2007/0024639 | A1* | 2/2007 | Hastings | G06T 11/203 345/613 |
| 2011/0050693 | A1* | 3/2011 | Lauritzen | G06T 15/60 345/426 |
| 2013/0021359 | A1* | 1/2013 | Baker | G06T 11/001 345/584 |
| 2013/0050432 | A1* | 2/2013 | Perez | G02B 27/017 348/47 |
| 2017/0124757 | A1* | 5/2017 | Sathe | G06T 15/005 |

OTHER PUBLICATIONS

Wichmann et al., "The psychometric function: I. Fitting, sampling, and goodness of fit," Perception & Psychophysics, vol. 63, No. 8, 2001, pp. 1293-1313.
Wichmann et al., "The psychometric function: II. Bootstrap-based confidence intervals and sampling," Perception & Psychophysics, vol. 63, No. 8, 2001, pp. 1314-1329.
Williams et al., "Off-axis Optical Quality and Retinal Sampling in the Human Eye," Vision Research, vol. 36, No. 8, 1996, pp. 1103-1114.
Yang et al., "Amortized Supersampling," ACM SIGGRAPH Asia 2009 Papers, 2009, pp. 1-12.
Baker, D., "Object space lighting," Game Developers Conference Powerpoint Presentation, Mar. 2016, pp. 1-16.
Banks et al. "Peripheral spatial vision: limits imposed by optics, photoreceptors, and receptor pooling,"Journal of the Optical Society of America, vol. 8, No. 11, Nov. 1991, pp. 1775-1787.
Clarberg et al., "AMFS: Adaptive Multi-Frequency Shading for Future Graphics Processors," ACM Transactions on Graphics, vol. 33, No. 4, Aug. 2014, pp. 1-12.
Cowey et al., "Human Cortical Magnification Factor and its Relation to Visual Acuity," Experimental Brain Research, vol. 21, No. 5, 1974, pp. 447-454.
Curico et al., "Topography of Ganglion Cells in Human Retina," Journal of Comparative Neurology, vol. 300, 1990, pp. 5-25.
Curico et al., "Human Photoreceptor Topography," Journal of Comparative Neurology, vol. 292, 1990, pp. 497-523.
Green, C., "Improved Alpha-Tested Magnification for Vector Textures and Special Effects," ACM SIGGRAPH Courses, 2007, pp. 1-5.
Grundland et al., "Cross Dissolve Without Cross Fade: Preserving Contrast, Color and Salience in Image Compositing," Eurographics, vol. 25, No. 3, 2006, pp. 1-10.
Guenter et al., "Foveated 3D Graphics," ACM Transactions on Graphics, vol. 31, No. 6, Article 164, Nov. 2012, pp. 164:1-164:10.
Hansen et al., "Color perception in the intermediate periphery of the visual field," Journal of Vision, vol. 9, No. 4, Apr. 30, 2009, pp. 1-12.
He et al., "Extending the Graphics Pipeline with Adaptive, Multi-Rate Shading," Transactions on Graphics, vol. 33, No. 4, pp. 1-12.
Jimenez et al., "SMAA: Enhanced Subpixel Morphological Antialiasing," Eurographics, vol. 31, No. 2, 2012, pp. 1-15.
Kim et al., "Edge-Aware Color Appearance," ACM Transactions on Graphics, vol. 30, No. 2, Apr. 2011, pp. 1-9.
Lauritzen et al., "Sample Distribution Shadow Maps," Symposium on Interactive 3D Graphics and Games, 2011, pp. 1-6.
Legge et al., "Contrast discrimination in peripheral vision" Journal Optical Society of America, vol. 4, No. 8, Aug. 1987, pp. 1594-1598.

Levi et al., "Vernier acuity, crowding and cortical magnification," Vision Research, vol. 25, No. 7, 1985, pp. 963-977.
Levitt, H., "Transformed Up-Down Methods in psychoacoustics," The Journal of the Acoustical society of America, vol. 49, No. 2, 1971, pp. 467-477.
McKee et al., "The Detection of Motion in the Peripheral Visual Field," Vision Research, vol. 24, No. 1, 1984, pp. 25-32.
Karis, B. "High-quality Temporal Supersampling," Advances in Real-Time Rendering in Games, SIGGRAPH Courses, Powerpoint Presentation, 2014, pp. 1-55.
Pharr et al., "Physically Based Rendering, From Theory to Implementation" Second Edition, Morgan Kaufmann Publishers, Inc, 2010, pp. 1-1172.
Walter et al., "Microfacet Models for Refraction through Rough Surfaces," Eurographics Symposium on Rendering, 2007, pp. 1-12.
Navarro et al., "Modulation transfer of the human eye as a function of retinal eccentricity," Journal of the Optical Society of America A, vol. 10, No. 2, 1993, pp. 201-121.
Rovamo et al., "An estimation and application of the human cortical magnification factor," Experimental Brain Research, Vo. 37, No. 3, 1979, pp. 495-510.
Thibos et al., "Retinal limits to the detection and resolution of gratings," Journal of the Optical Society of America A, vol. 4, No. 8, pp. 1987, 1524-1529.
Thibos et al., "Calculation of the influence of lateral chromatic aberration on image quality across the visual field," Journal of the Optical Society of America A, vol. 4, No. 8, 1987, pp. 1673-1680.
Vlachos, A., "Advanced VR Rendering," Game Developers Conference, Mar. 4-6, 2015, pp. 1-67.
Ferree et al., "Refraction for the peripheral field of vision," Archives of Ophthalmology 5, vol. 5, 1931, pp. 717-731.
Hill et al., "Physically based shading in theory and practice," ACM SIGGRAPH Courses, 2016, pp. 22:1-22:8.
Kelly, D. H., "Retinal inhomogeneity. i. spatiotemporal contrast sensitivity," Journal of the Optical Society of America A, vol. 1, No. 1, 1984, pp. 107-113.
Koenderink et al., "Perimetry of contrast detection thresholds of moving spatial sine patterns. II. The far peripheral visual field (eccentricity 0 degrees-50 degrees)," Journal of the Optical Society of America A, vol. 68, No. 6, 1978, pp. 850-854.
Koenderink et al., Perimetry of contrast detection thresholds of moving spatial sine wave patterns. I. The near peripheral visual field (eccentricity 0 degrees-8 degrees). Journal of the Optical Society of America A, vol. 68, No. 6, 1978, pp. 845-849.
Koenderink et al., "Perimetry of contrast detection thresholds of moving spatial sine wave patterns. III. The target extent as a sensitivity controlling parameter," Journal of the Optical Society of America A, vol. 68, No. 6, 1978, pp. 854-860.
Noorlander et al., "Sensitivity to spatiotemporal colour contrast in the peripheral visual field," Vision Research, vol. 23, No. 1, 1983, pp. 1-11.
Salvi et al., U.S. Appl. No. 15/452,651, titled "Improved Method for Data Reuse and Applications to Spatio-Temporal Supersampling and De-Noising," filed Mar. 7, 2016.
Kaplanyan, A. S., "Stable specular hightlights," Game Developers Conference Talk, Mar. 2016, pp. 1-23.
Vaidyanathan et al., "Coarse Pixel Shading," High Performance Graphics (2014), 2014, pp. 1-10.
Lauritzen, A., "Rendering Antialiased Shadowsusing Warped Variance Shadow Maps," Thesis to University of Waterloo, 2008, pp. 1-43.
Grundland et al., "Cross Dissolve Without Cross Fade: Preserving Contrast, Color and Salience in Image Compositing," Eurographics 2006, vol. 25, No. 3, 2006, pp. 1-10.
Igehy, H., "Tracing Ray Differentials," Computer Graphics SIGGRAPH '99 Proceedings, 1999, pp. 1-8.
Williams, L., "Pyramidal Parametrics," Computer Graphics, vol. 17, No. 3, Jul. 1983, pp. 1-11.
Olano et al., "Lean mapping," Proceedings of the 2010 ACM SIGGRAPH symposium on Interactive 3D Graphics and Games, ACM, 2010, pp. 1-8.
Guenter et al., "Foveated 3D Graphics," ACM Transactions on Graphics (TOG) 31.6 (2012), 2012, pp. 1-10.

(56) References Cited

OTHER PUBLICATIONS

Jakob, W., "Light Transport on Path-Space Manifolds," Dissertation of the Graduate School of Cornell University, Aug. 2013, pp. 1-153.
Blinn J. F., "Models of light reflection for computer synthesized pictures," SIGGRAPH '77, vol. 11, No. 2, Jul. 1977, pp. 192-198.
Becker et al., "Smooth transitions between bump rendering algorithms," Computer Graphics and Interactive Techniques, Computer Graphics, 1993, pp. 183-189.
Bruneton et al., "A survey of nonlinear prefiltering methods for efficient and accurate surface shading," IEEE Transactions on Visualization and Computer Graphics, vol. 18, No. 2, May 2011, pp. 1-22.
Bosch C., "Realistic Image Synthesis of Surface Scratches and Grooves," PhD thesis, Universitat Polit'ecnica de Catalunya, Jul. 2007, pp. 1-172.
Burley B., "Physically-based shading at Disney," ACM SIGGRAPH Courses, 2012, pp. 1-27.
Cook et al., "A Reflectance Model for Computer Graphics," ACM Transactions on Graphics, vol. 1, No. 1, Jan. 1982, pp. 7-24.
Dupuy et al., "Linear Efficient Antialiased Displacement and Reflectance Mapping," ACM Transactions on Graphics, vol. 32, No. 6, 2013, pp. 1-13.
Fournier A., "Normal Distribution Functions and Multiple Surfaces," In Graphics Interface Workshop on Local Illumination, 1992, pp. 45-52.
Heitz E., "Understanding the masking-shadowing function in microfacet-based BRDFs," Journal of Computer Graphics Techniques, vol. 3, No. 2, 2014, pp. 32-91.
Hanika et al., "Improved Half Vector Space Light Transport," Eurographics Symposium on Rendering, vol. 34, No. 4, 2015, pp. 1-10.
Han et al., "Frequency domain normal map filtering," ACM Transactions on Graphics, vol. 26, No. 3, 2007, pp. 1-11.
Jakob et al., "Discrete stochastic microfacet models," ACM Transactions on Graphics (Proc. SIGGRAPH), vol. 33, No. 4, 2014, pp. 115:1-115:10.
Jakob et al., "Manifold exploration: a Markov chain Monte Carlo technique for rendering scenes with difficult specular transport," ACM Transactions on Graphics (Proc. SIGGRAPH), vol. 31, No. 4, 2012, pp. 58:1-58:13.
Kaplanyan et al., "The natural-constraint representation of the path space for efficient light transport simulation," ACM Transactions on Graphics (Proc. SIGGRAPH), vol. 33, No. 4, 2014, pp. 1-13.
Kajiya et al., "Rendering fur with three dimensional textures," Computer Graphics, vol. 23, No. 3, Jul. 1989, pp. 271-280.
Kautz et al., "Towards Interactive Bump Mapping With Anisotropic Shift-Variant BRDFs," SIGGRAPH/Eurographics Workshop on Graphics Hardware, 2000, pp. 51-58.
Marschner et al., "Light scattering from human hair fibers," ACM Transactions on Graphics, 2003, vol. 22, pp. 1-12.
Nagano et al., "Skin microstructure deformation with displacement map convolution," ACM Transactions on Graphics, vol. 34, No. 4, 2015, pp. 109:1-109:10.
Poulin et al., "A model for anisotropic reflection," Computer Graphics, vol. 24, No. 4, 1990, pp. 273-282.
Smith B., "Geometrical shadowing of a random rough surface," IEEE Transactions on Antennas and Propagation, vol. 15, No. 5, 1967, pp. 668-671.
Tan et al., "Filtering and rendering of resolution-dependent reflectance models," IEEE Transactions on Visualization and Computer Graphics, vol. 14, No. 2, 2008, pp. 412-425.
Toksvig, M., "Mipmapping Normal Maps," Journal of Graphics, Apr. 26, 2004, pp. 1-10.
Trowbridge et al., "Average irregularity representation of a rough surface for ray reflection," Journal of the Optical Society of America, vol. 65, No. 5, 1975, pp. 531-536.
Torrance et al., "Theory for off-specular reflection from roughened surfaces," Journal of the Optical Society of America, vol. 57, No. 9, 1967, pp. 1105-1112.
Ward G., Measuring and modeling Anisotropic Reflection, Computer Graphics, vol. 26, No. 2, Jul. 1992, pp. 265-272.
Westin et al., "Predicting reflectance functions from complex surfaces," Computer Graphics, vol. 26, No. 2, 1992, pp. 1-10.
Wu et al., "Physically-Based Interactive Bi-Scale Material Design," ACM Transactions on Graphics, vol. 30, No. 6, Article 145, Dec. 2011, pp. 145:1-145:10.
Wu et al., "Inverse bi-scale material design," ACM Transactions on Graphics (Proc. SIGGRAPH Asia), vol. 32, No. 6, 2013, pp. 163:1-163:10.
Yan et al., "Rendering Glints on High-Resolution Normal-Mapped Specular Surfaces," ACM Transactions on Graphics, vol. 33, No. 4, Jul. 2014, pp. 116:1-116:9.
Makela et al., "Identification of facial images in peripheral vision," Vision Research, vol. 41, 2001, pp. 599-610.
Olano et al., "Lean Mapping," Symposium on Interactive 3D Graphics and Games, 2010, pp. 1-8.
Oztireli et al., "Perceptually Based Downscaling of Images," ACM transactions on Graphics, 2015, pp. 1-10.
Rosen, R., "Peripheral Vision: Adaptive Optics and Psychophysics," Doctoral Thesis, Apr. 2013, 86 pages.
Rovamo et al., "Resolution of gratings oriented along and across meridians in peripheral vision," Investigative Ophthalmology & Visual Science, vol. 23, No. 5, Nov. 1982, pp. 666-670.
Salvi et al., "Multi-Layer Alpha Blending," Proceedings of the 18th meeting of the ACM SIGGRAPH Symposium on Interactive 3D Graphics and Games, Mar. 14-16, 2014, pp. 1-7.
Schutt et al., "Painfree and accurate bayesian estimation of psychometric functions for (potentially) over dispersed data," Vision Research, vol. 122 , May 2016, pp. 105-123.
Solomon et al., "Chromatic Organization of Ganglion Cell Receptive Fields in the Peripheral Retina," The Journal of Neuroscience, May 4, 2005, vol. 25, No. 18, pp. 4527-4539.
Strasburger et al., "Cortical Magnification Theory Fails to Predict Visual Recognition," European Journal of Neuroscience, vol. 6, 1994, pp. 1583-1588.
Strasburger et al., "Peripheral vision and pattern recognition: A review," Journal of Vision, vol. 11, No. 5, Dec. 28, 2011, pp. 1-82.
Thibos et al., "Vision Beyond the Resolution Limit: Aliasing in the Periphery," Vision Research, vol. 27, No. 12, 1987, pp. 2193-2197.
Thibos et al., "Characterization of Spatial Aliasing and Contrast Sensitivity in Peripheral Vision," Vision Research, vol. 36, No. 2, 1996, pp. 249-258.
Wang et al., "Undersampling Produces Non-veridical Motion Perception, but Not Necessarily Motion Reversal, in Reripheral Vision," Vision Research, vol. 36, No. 12, 1996, pp. 1737-1744.

* cited by examiner

PERCEPTUALLY-BASED FOVEATED RENDERING USING A CONTRAST-ENHANCING FILTER

CROSS-REFERENCE TO RELATED APPLICATIONS

This application claims the benefit of U.S. Provisional Application No. 62/305,452 titled "Specular Antialiasing with Normal Distribution Function Pre-filtering," filed Mar. 8, 2016, the entire contents of which is incorporated herein by reference. This application also claims the benefit of U.S. Provisional Application No. 62/366,554 titled "Perceptually-Based Foveated Rendering Using a Contrast-Enhancing Filter," filed Jul. 25, 2016, the entire contents of which is incorporated herein by reference.

FIELD OF THE INVENTION

The present invention relates to graphics processing, and more particularly to foveated rendering.

BACKGROUND

Foveated rendering systems have been used to reduce the amount of calculations required to render an image. Foveated rendering systems take advantage of the physiological trait of the human eye in that the distribution of rods and cones across a human retina is not constant. A user's visual perception will have higher acuity in the fovea than at the periphery of the retina. Consequently, portions of an image in the periphery relative to a viewer's line of sight may be rendered at a lower resolution or level of detail in order to save on compute bandwidth in real-time rendering systems.

However, this reduction in computations results in some artifacts. Notably, viewers may perceive aliasing in the periphery of the image where the shading rate has been reduced. The viewers may also complain of tunnel vision where the blurring in the periphery of the image is too extreme and the user's visual perception of the lower-resolution portion of the image is distracting. Finally, current foveated rendering systems may be designed for desktop displays and not, high resolution, high field of view head mounted displays that have different requirements for the foveated rendering system. Thus, there is a need for addressing these issues and/or other issues associated with the prior art.

SUMMARY

A method, computer readable medium, and system are disclosed for rendering images utilizing a foveated rendering algorithm with post-process filtering to enhance a contrast of the foveated image. The method includes the step of receiving a three-dimensional scene, rendering the 3D scene according to a foveated rendering algorithm to generate a foveated image, and filtering the foveated image using a contrast-enhancing filter to generate a filtered foveated image. The foveated rendering algorithm may incorporate aspects of coarse pixel shading, mipmapped texture maps, linear efficient anti-aliased normal maps, exponential variance shadow maps, and specular anti-aliasing techniques. The foveated rendering algorithm may also be combined with temporal anti-aliasing techniques to further reduce artifacts in the foveated image.

DETAILED DESCRIPTION

Foveated rendering is an important technology for improving the efficiency of high-resolution and high field-of-view (FOV) graphics applications, which may be intimately related to Virtual Reality (VR) or Augmented Reality (AR) systems, although foveated rendering can also be implemented in desktop display systems. Foveated rendering may be used with gaze-tracking displays, which may include a display (or a pair of displays) along with one or more sensors for tracking the line of sight of a viewer. For example, a camera or cameras may be used to capture images of a user's eyes, and image processing techniques may be used to estimate a line of sight of the user based on the captured images. The line of sight is mapped to a location in an image that corresponds with a point of focus on the display. The image for display is then rendered with a variable shading rates, where a maximum shading rate corresponds with the location in the image that corresponds with the point of focus on the display. The image will be perceived by the viewer such that pixels rendered at a higher shading rate are perceived on the fovea of the viewer's eye, and pixels rendered at a lower shading rate are perceived on the periphery of the retina. Since the fovea is associated with higher visual acuity, more rendering time is spent focused on the portions of the image that will be perceived on the fovea.

Existing solutions for foveated rendering result in noticeable artifacts in the peripheral vision (e.g., temporal aliasing, flicker, and tunnel-vision) and, therefore, cannot be pushed to aggressive levels. A perceptually-based foveated rendering technique employs a contrast-enhancing filter to images rendered using a foveated rendering algorithm to address contrast loss in the periphery of the image, which has a large effect on the perceived quality of the image. The foveated rendering algorithm incorporates a number of pre-filtering techniques during rendering, including the use of specular anti-aliasing, exponential variance shadow maps (EVSM), and linear efficient anti-aliased normal (LEAN) maps. Furthermore, the foveated rendering system integrates temporal anti-aliasing techniques that improve temporal stability of the image. Consequently, the foveated rendering technique discussed below is superior to, and more efficient than, existing solutions.

Figure 1:
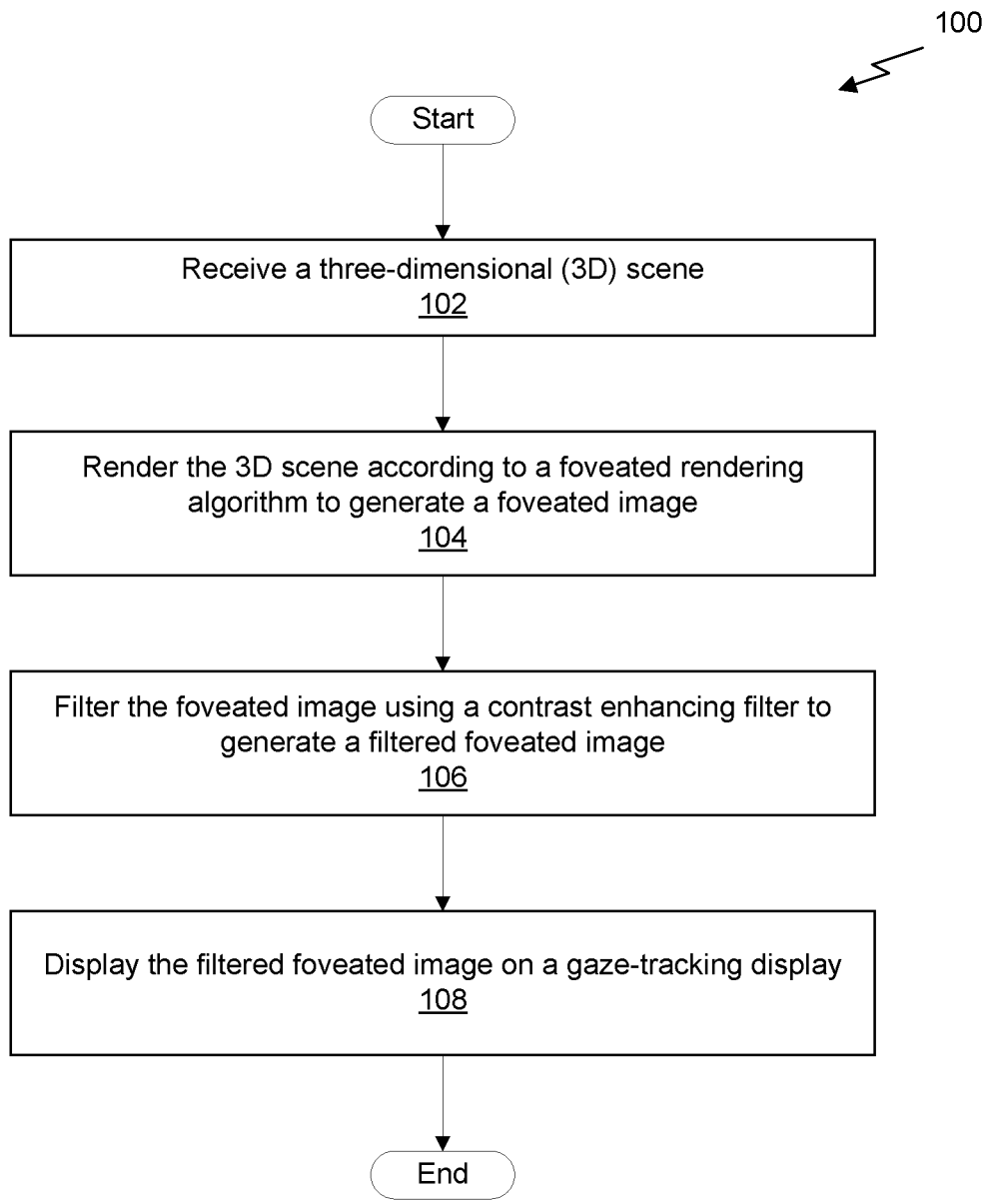
FIG. 1 illustrates a flowchart of a method for rendering a foveated image, in accordance with one embodiment.

FIG. 1 illustrates a flowchart of a method 100 for rendering a foveated image, in accordance with one embodiment. It will be appreciated that the method 100 is described within the scope of software executed by a processor; however, in some embodiments, the method 100 may be implemented in hardware or some combination of hardware and software. The method 100 begins at step 102, where a three-dimensional (3D) scene is received. The 3D scene may be specified as a plurality of geometric primitives generated by a graphics application and stored in a memory. At step 104, the 3D scene is rendered according to a foveated rendering algorithm to generate a foveated image. In one embodiment, the 3D scene may be rendered by a graphics processing pipeline that incorporates a fragment shader implementing the foveated rendering algorithm. The geometric primitives of the 3D scene may be transformed in a vertex shading stage and rasterized in a rasterization stage of the graphics processing pipeline to produce fragments for processing by the fragment shader. These fragments are then processed at a variable shading rate set based on sensor feedback from a gaze-tracking display.

In one embodiment, the foveated rendering algorithm is implemented as a coarse pixel shading shader, the execution of which is shared by multiple fragments and includes instructions configured to: (1) sample a mip-mapped texture map at a level-of-detail (LOD) calculated based on, at least in part, a variable shading rate corresponding with a sample location; (2) sample a LEAN map for calculating lighting effects; and/or (3) sample an EVSM for calculating shadows. The foveated rendering algorithm may also incorporate a form of temporal anti-aliasing (TAA) in a post-process step to blend the foveated image for a current frame with a foveated image for a previous frame.

At step 106, the foveated image is filtered using a contrast-enhancing filter to generate a filtered foveated image. The contrast-enhancing filter comprises, for each pixel in the foveated image, calculating a contrast-enhanced color for the pixel that in effect is a linear redistribution of colors around a mean of a color distribution proximate the pixel. The contrast-enhancing filter reduces the effect of the artifacts in the periphery of the foveated image by boosting the contrast in those portions of the image. At step 108, the filtered foveated image is displayed to a viewer on a gaze-tracking display.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
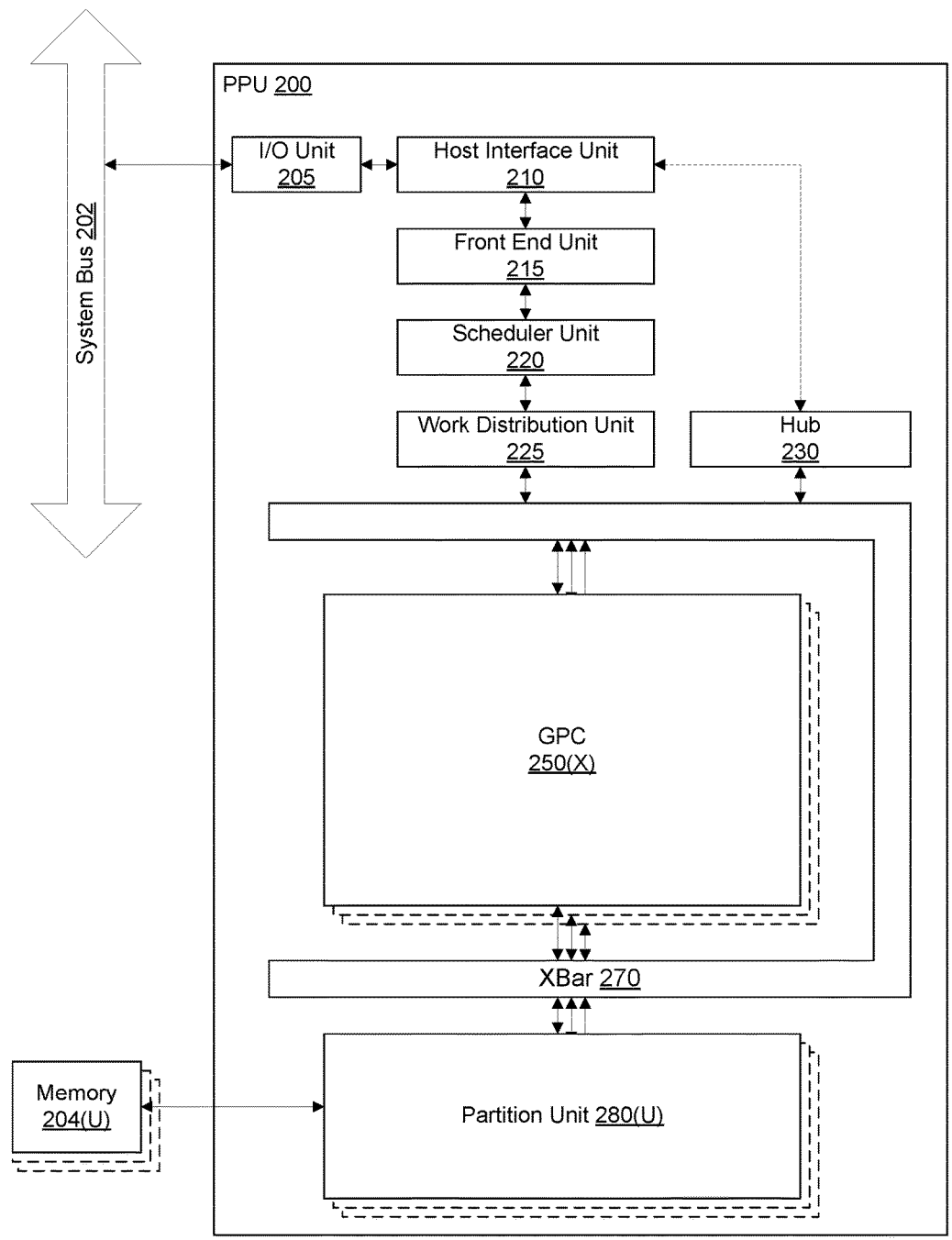
FIG. 2 illustrates a parallel processing unit (PPU), in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
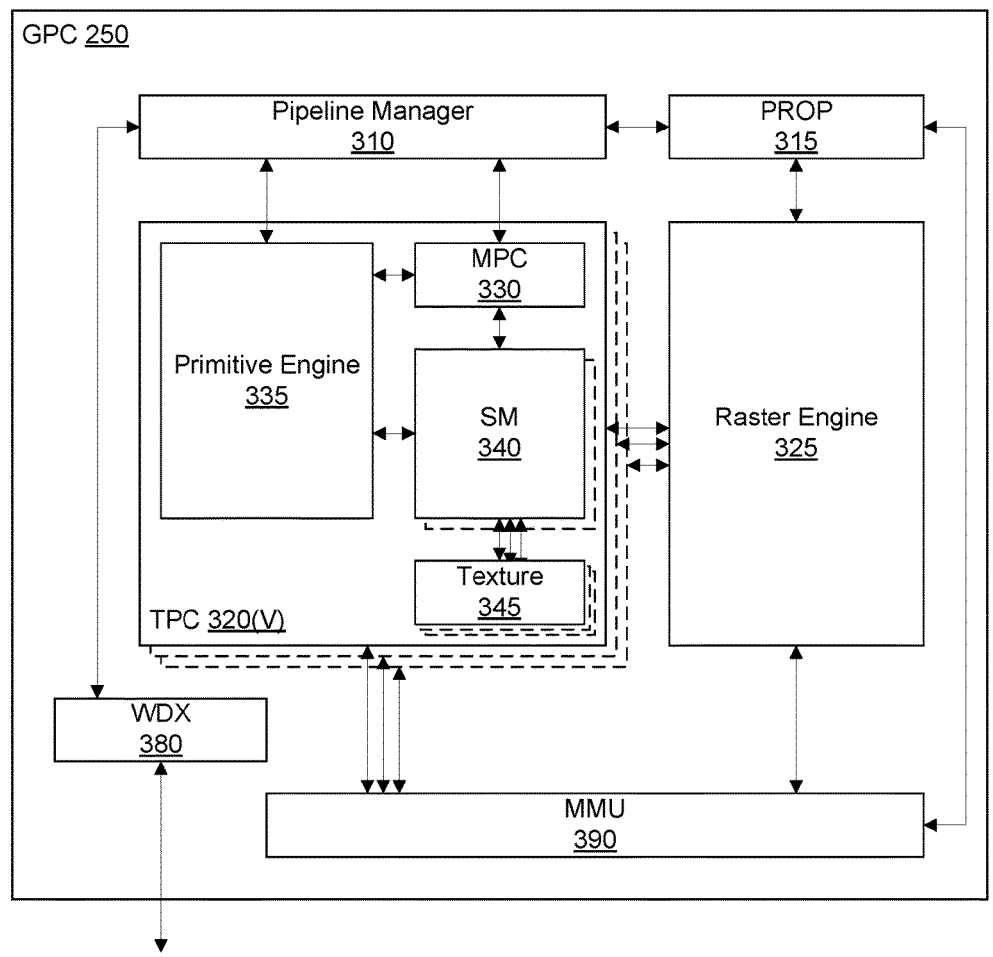
FIG. 3A illustrates a general processing cluster of the PPU of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 325 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
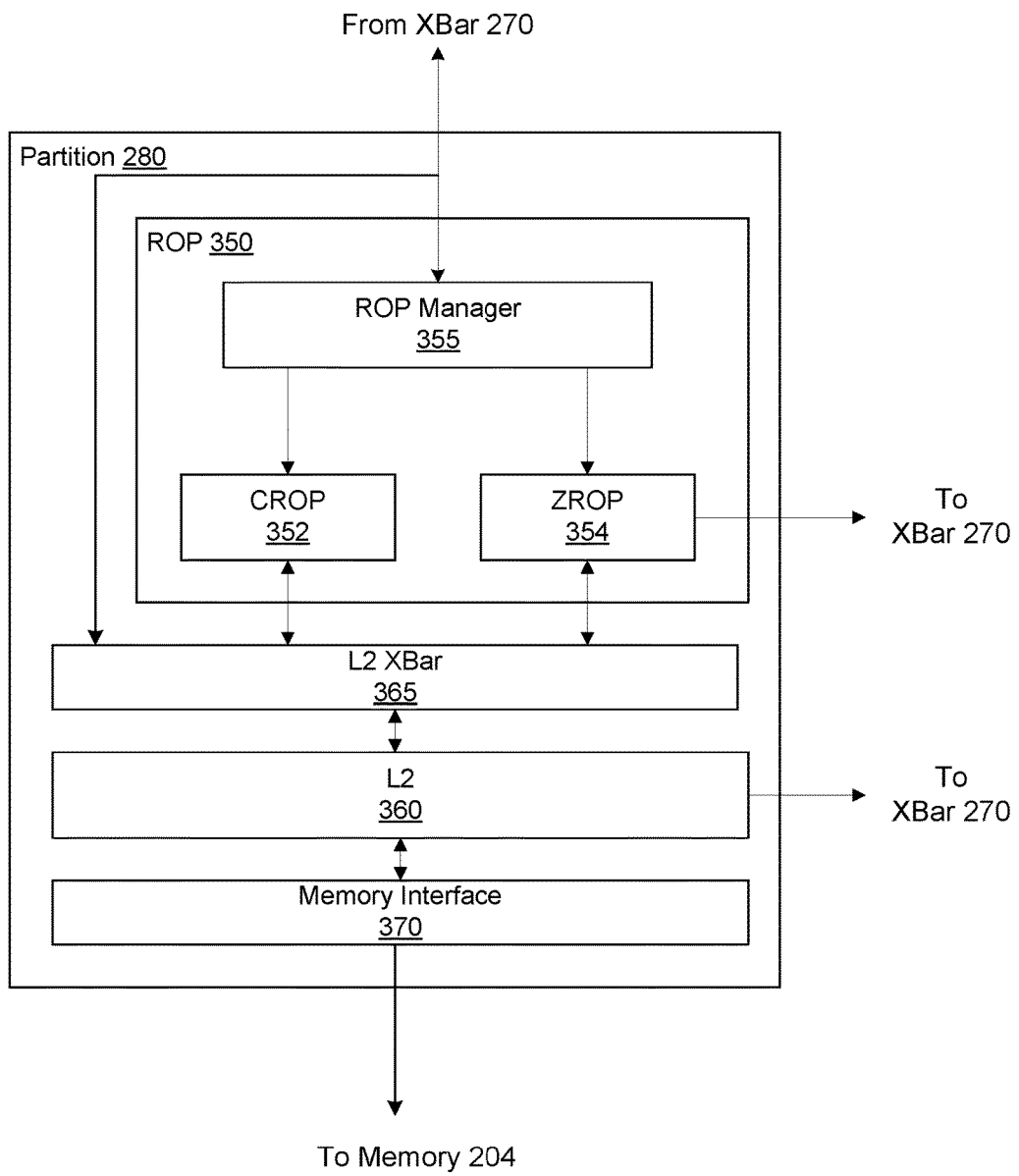
FIG. 3B illustrates a partition unit of the PPU of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
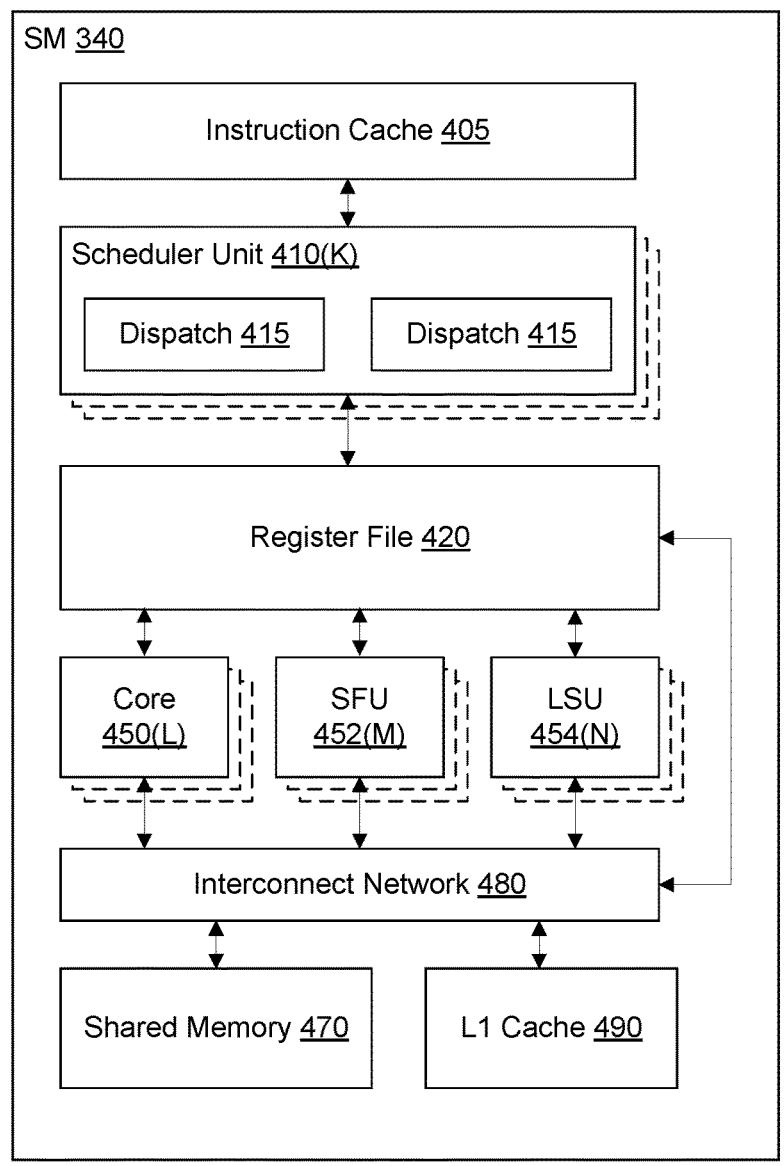
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
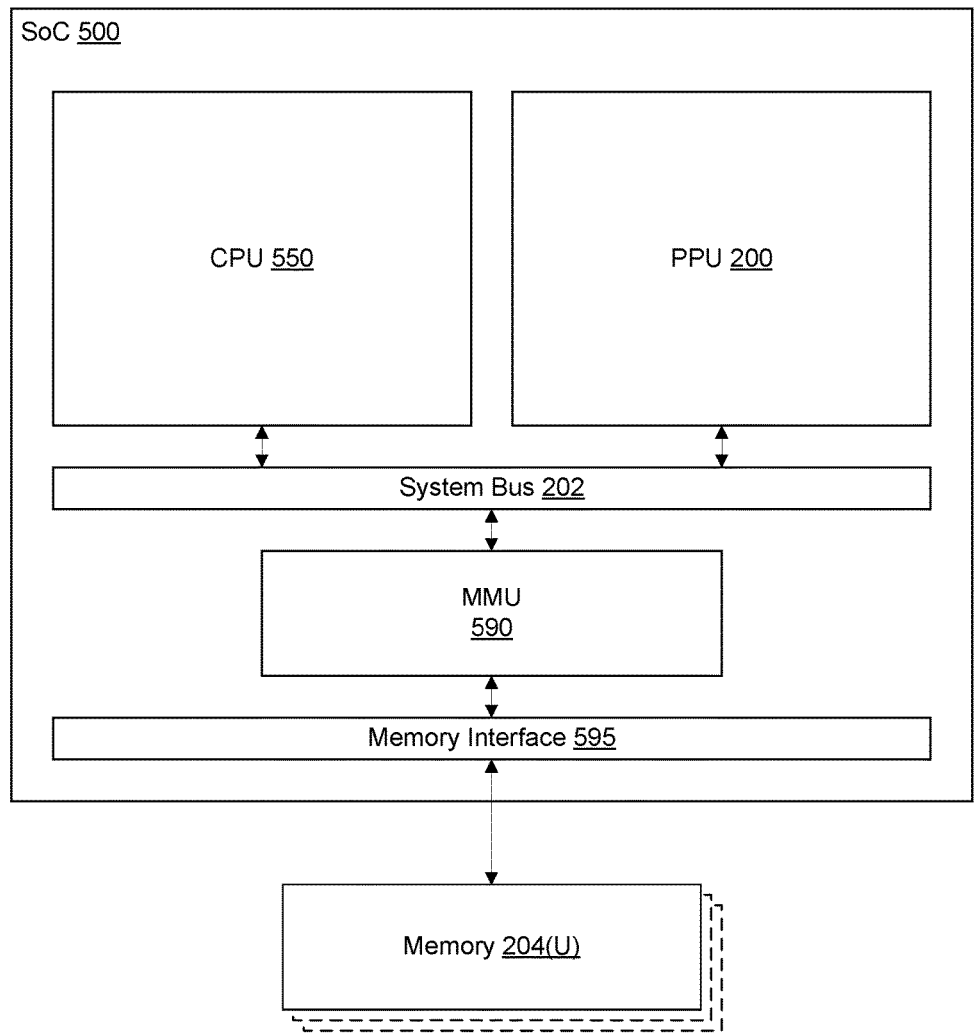
FIG. 5 illustrates a system-on-chip including the PPU of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
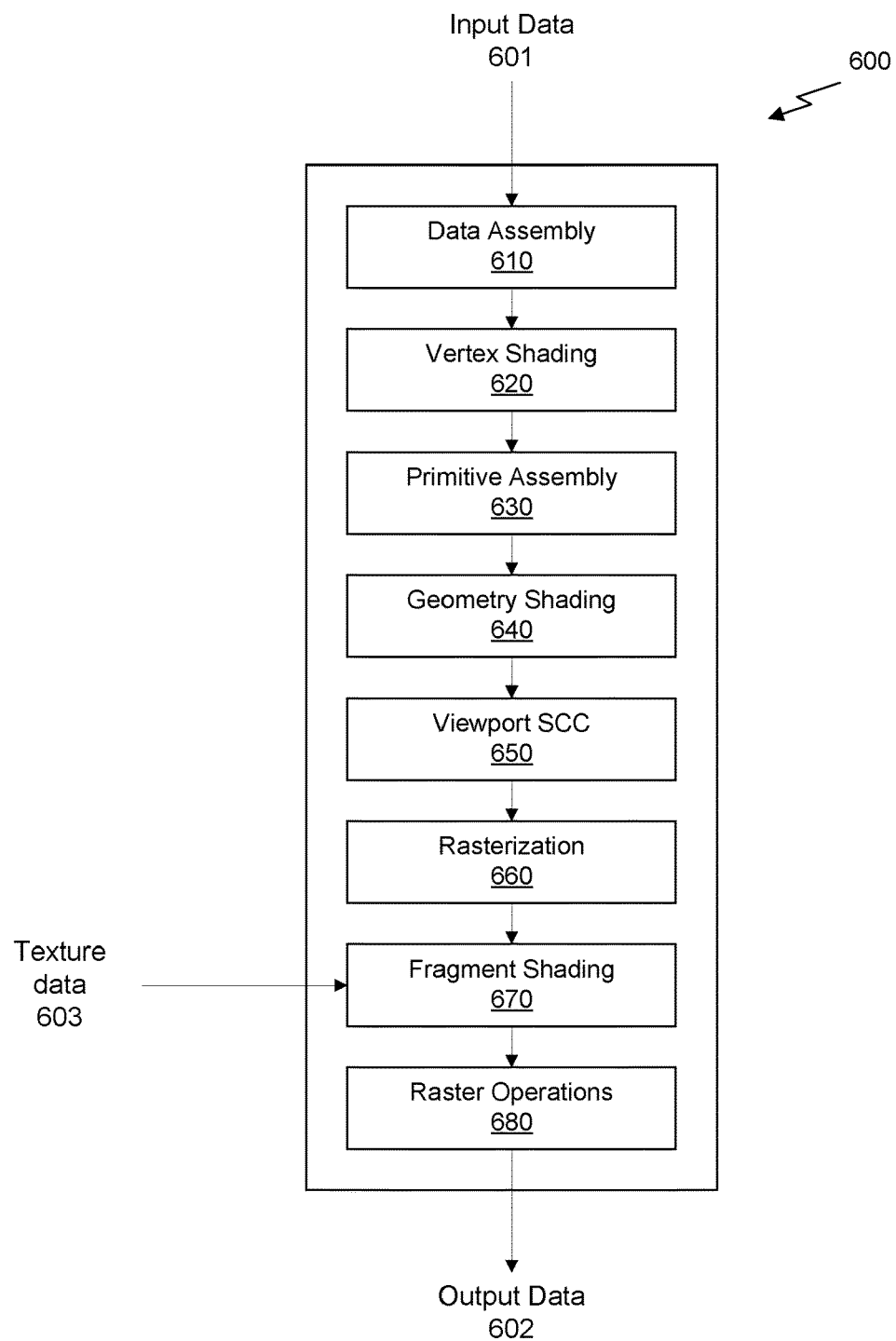
FIG. 6 is a conceptual diagram of a graphics processing pipeline implemented by the PPU of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

In one embodiment, the fragment shading stage 670 may sample a texture map using the texture unit(s) 345 of PPU 200. Texture data 603 may be read from the memory 204 and sampled using the texture unit 345 hardware. The texture unit 345 may return a sampled value to the fragment shading stage 670 to be processed by the fragment shader.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Foveated Rendering

Even with tremendous advances in graphics hardware, computational requirements for real-time rendering systems is keeping pace with or exceeding the advancements in hardware. Adaption of more realistic lighting and physics-based shading amplifies shading complexity, while at the same time, frame rates and resolution of head mounted displays in VR and AR systems has increased the number of calculations that need to be performed and compressed those calculations into shorter and shorter time frames. As a result, rendering algorithms that can reduce the complexity of the shading calculations without sacrificing image quality are becoming more and more important.

Again, human visual acuity radically decreases between the center of the retina (i.e., the fovea) and the retina's periphery. Foveated rendering algorithms exploit this phenomenon to improve performance by decreasing rendering quality towards the periphery of the retina while maintaining high fidelity in or near the fovea. Coupled with high-quality gaze tracking systems, foveated rendering algorithms could become ubiquitous with high FOV displays targeting higher resolutions and higher refresh rates.

In order to study the issues with current foveated rendering systems, tests using various subjects were performed. Images rendered at a constant, high resolution were blurred with a Gaussian filter where the size of the filter increased based on the distance from a fixation point (i.e., a point in the image corresponding, roughly, to the center of a viewer's fovea). The larger the radius of the Gaussian filter, the worse the effect of tunnel-vision experienced by the subjects. This effect is likely caused by the loss of contrast in the viewer's peripheral vision. Enhancing contrast in the periphery of the image, using a post processing technique, enabled a 2× larger rate of increase in the Gaussian filter size before the viewer experienced the same sense of tunnel-vision.

Consequently, a foveated rendering system can be created that generates images at far more aggressive rates of change in rendering quality from the fixation point to the periphery than current foveated rendering systems without suffering from the same undesirable artifacts because the rendered images are post-processed with an image-enhancing filter that increases the contrast of the lower resolution portions of the image.

Figure 7:
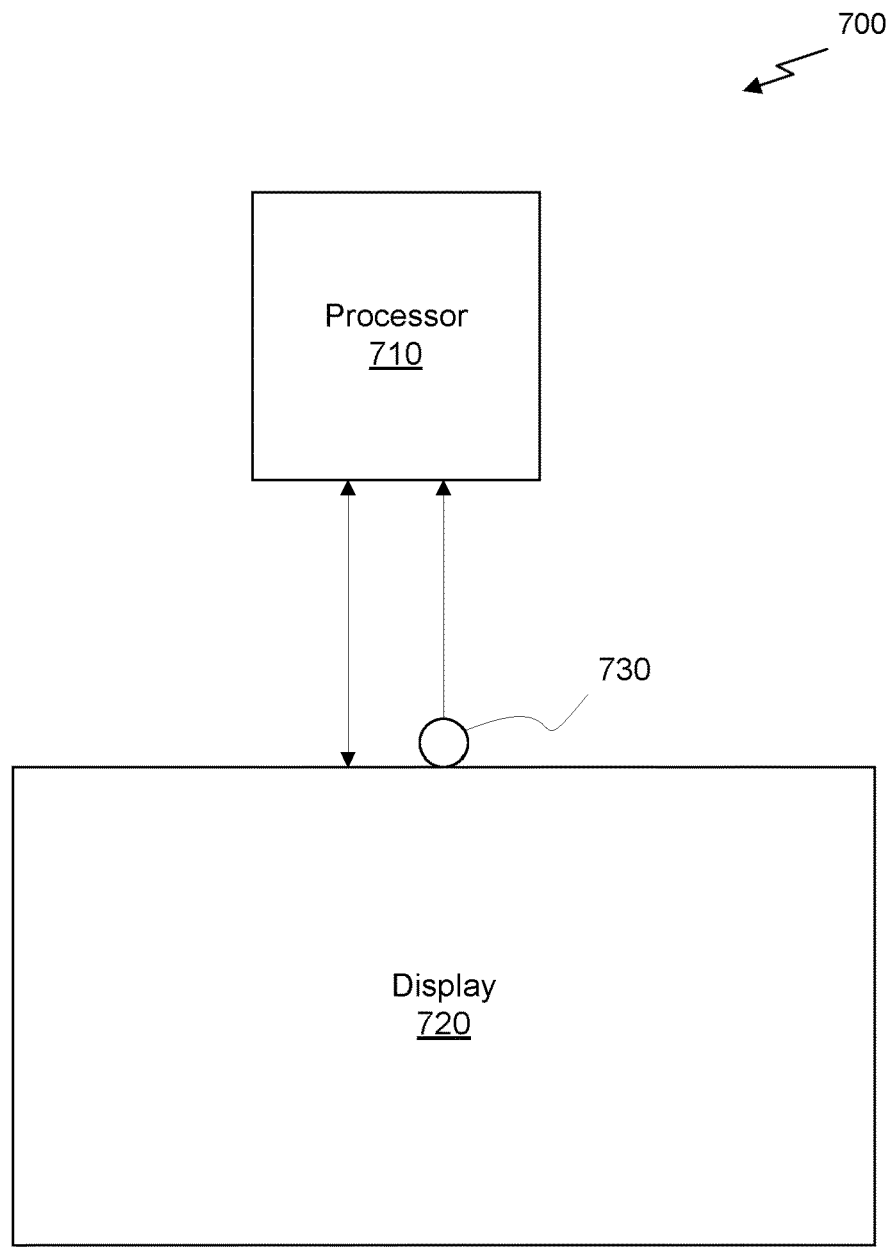
FIG. 7 illustrates a foveated rendering system, in accordance with one embodiment.

FIG. 7 illustrates a foveated rendering system 700, in accordance with one embodiment. The system 700 includes a processor 710, a display 720, and one or more sensor(s) 730. The processor 710 may be any conventional type of general purpose processor, such as a central processing unit (CPU) having one or more cores, a graphics processing unit (GPU) having one or more cores, a system-on-chip (SoC) having one or more CPU cores as well as one or more GPU cores, or a plurality of processors, including any combination of CPU or GPU cores in one or more packages coupled together on a printed circuit board or combined via one or more interfaces. In one embodiment, the processor 710 is the PPU 200 described in FIGS. 2 through 4, and the processor 710 may implement, at least in part, the graphics processing pipeline 600 of FIG. 6. In another embodiment, the processor 710 is the SoC 500 of FIG. 5.

The display 720 may be any conventional type of display including, but not limited to, a liquid crystal display (LCD), a light emitting diode (LED) display, an active matrix organic light emitting diode (AMOLED) display, a projection screen and projector, and the like. The display 720 receives video signals from the processor 720 that encode images for presentation to a viewer. The images encoded by the video signals are generated by a foveated rendering algorithm implemented by the processor 710. One or more sensors 730 are associated with the display 720 to perform a gaze-tracking function. In one embodiment, each of the sensor(s) 730 comprises an image sensor that captures an image of a viewer. The sensor 730 may include hardware for analyzing the images to determine a fixation point of the viewer that corresponds with a point of focus of the viewer on the display 720. The sensor 730 may be configured to capture images, analyze the images, and transmit a stream of fixation point coordinates to the processor 710 that are provided as an input to the foveated rendering algorithm. Alternatively, the sensor 730 is configured to capture the images and transmit the images to the processor 710 for analysis by the processor 710. The processor 710 then determines the fixation point based on the images.

The processor 710 is configured to receive source image data for rendering via the foveated rendering algorithm. In one embodiment, an application, such as a computer graphics application or video game, is executed by a processor and is configured to generate the source image data for display. The source image data may comprise three-dimensional (3D) model data that include a plurality of geometric primitives to be rendered by the graphics processing pipeline 600. The graphics processing pipeline 600 is modified such that the rasterization stage 660 and/or the fragment shading stage 670 utilize the fixation point generated by the sensor 730. A foveated image is generated by the graphics processing pipeline 600 and then the foveated image is filtered to enhance the contrast in the periphery of the foveated image. The filtered image is then encoded into the video signal and transmitted to the display 720.

It will be appreciated that the display may be a desktop display or television where the user's eyes are not located at a fixed distance from the display. Therefore, the fixation point may be augmented by a distance of the viewer to the display. The distance of the viewer and the fixation point may be used to estimate the size of a fixation region that corresponds with the user's fovea. In other words, the distance of the user from the display determines the FOV covered by the extents of display, which affects a rate of change of the rendering quality as the pixels move from the fixation point to the periphery of the foveated image. Alternatively, instead of a distance of the viewer, the fixation point may be augmented by a FOV angle that indicates the FOV of the viewer that matches the extents of the display 720. The FOV increases as the size of the display increases or as the viewer gets closer to the display and, therefore, the rate of change in the rendering quality as the pixels move from the fixation point to the periphery can be adjusted accordingly.

Figure 8:
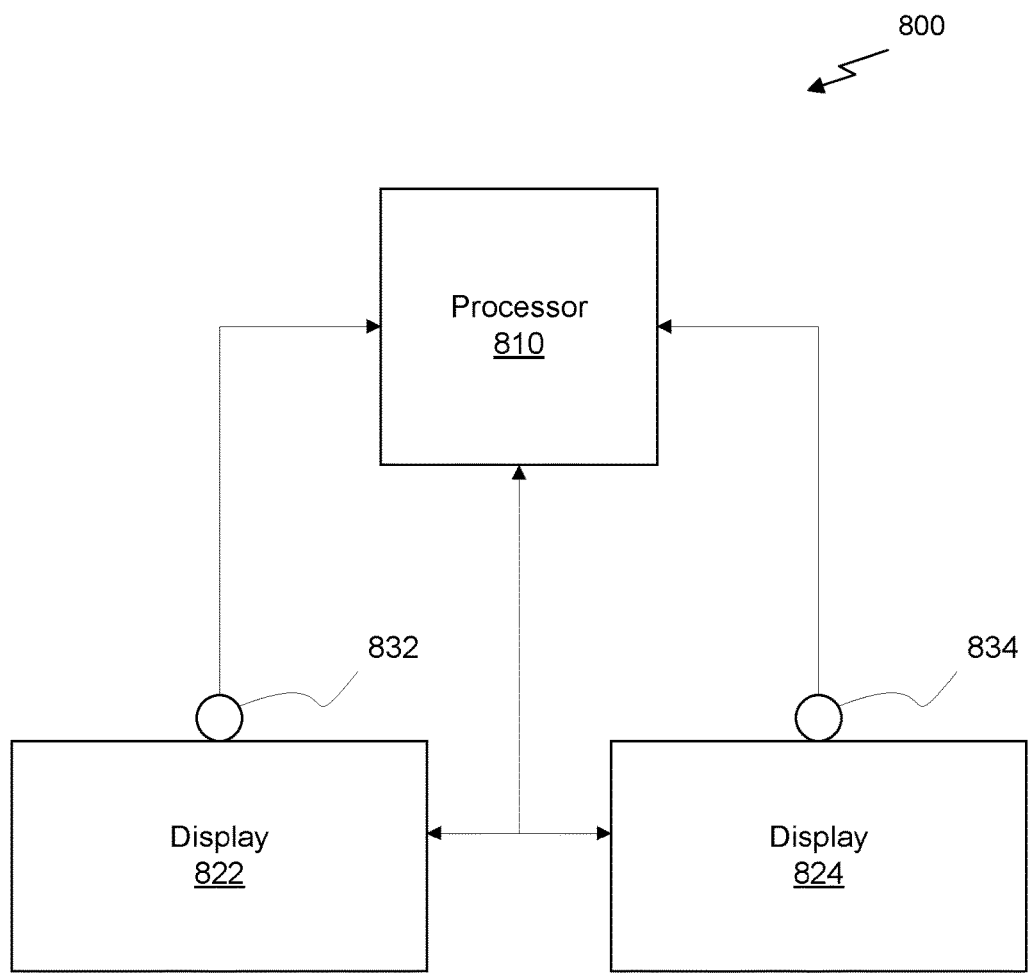
FIG. 8 illustrates a foveated rendering system, in accordance with one embodiment.

FIG. 8 illustrates a foveated rendering system 800, in accordance with one embodiment. The system 800 may be a head mounted display (HMD) that includes a processor 810, a left eye display 822, one or more left eye sensor(s) 832, a right eye display 824, and one or more right eye sensor(s) 834. The processor 810 is similar to processor 710, except that the graphics processing pipeline 600 may be modified to produce stereoscopic image frames that include a left eye image and a right eye image. The left eye images of the stereoscopic image frames are displayed on the left eye display 822 to be presented to a left eye of the viewer, and the right eye images of the stereoscopic image frames are display on the right eye display 824 to be presented to a right eye of the viewer. In one embodiment, the one or more left eye sensors 832 perform gaze-tracking of the left eye of the viewer, transmitting a fixation point of the left eye of the viewer relative to a location of the left eye image, and the one or more right eye sensors 834 perform gaze tracking of the right eye of the viewer, transmitting a fixation point of the right eye of the viewer relative to a location of the right eye image.

It will be appreciated that the system 800 is suitable for VR and AR applications where the displays 822 and 824 are placed close to the viewer's eyes such that each eye only views one of the displays 822 and 824. In such cases, the distance from the user's eyes to the displays 822 and 824 is relatively constant, since the HMD will typically be rested on the user's head using a frame resting on the user's nose and/or ears or secured to the user's head with a strap that surrounds the user's head. Consequently, the fixation point transmitted from the sensors 832 and 834 to the processor 810 may not be augmented by a distance to the viewer or a FOV associated with the viewer because the distance and/or FOV of each of the displays 822 and 824 may be relatively constant when the displays 822 and 824 are in use.

Figure 9:
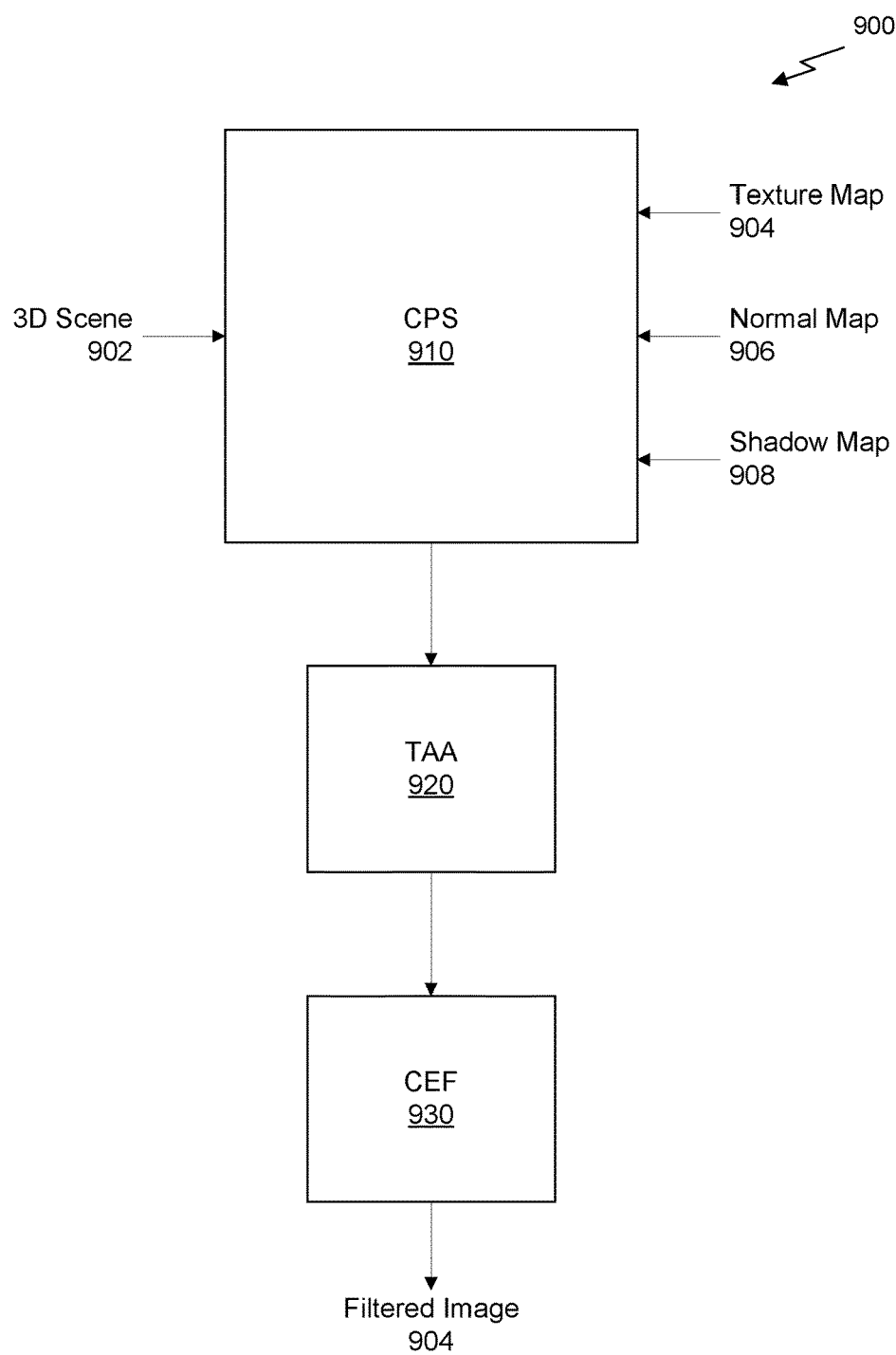
FIG. 9 illustrates a foveated rendering algorithm, in accordance with one embodiment.

FIG. 9 illustrates a foveated rendering algorithm 900, in accordance with one embodiment. The foveated rendering algorithm implements coarse pixel shading (CPS) to render images at variable resolution across the image. The foveated rendering algorithm may be combined with temporal anti-aliasing (TAA) techniques in a post-process step to reduce aliasing artifacts caused by reducing the resolution of the rendered image in the periphery of the image relative to the fixation point. Finally, a contrast-enhancing filter (CEF) is applied to the resolved image generated by the foveated rendering algorithm to further reduce the effects caused by the reduced resolution of the image in the periphery.

As shown in FIG. 9, a 3D scene 902 is received at the CPS shader 910. The 3D scene 902 may comprise fragments generated by a rasterizer such as the rasterization stage 660 of the graphics processing pipeline 600. The rasterizer transforms 3D geographic primitives in a world space into pixel fragments in a screen space (i.e., in a pixel coordinate space). The rasterizer may utilize z-buffering techniques (i.e., depth testing) to test the visibility of each triangle in a filtering step that reduces the amount of shading that is performed by the CPS shader 910 by culling primitives that will not be visible in the final image. It will be appreciated that the fragments are generated at a fixed resolution that is decoupled from the local shading rate of the CPS shader 910 for each pixel or pixel tile. For example, the rasterizer may be configured to evaluate visibility of a triangle at one sample per pixel (or multiple samples per pixel in the case of MSAA or SSAA) to generate visibility information for the triangle corresponding with a number of pixels of a pixel tile in a final image. However, the CPS shader 910 may shade fragments at a rate of one color value per pixel, or one color value for multiple pixels, depending on a pixel location, which may be different than the visibility sampling performed by the rasterizer.

In one embodiment, the CPS shader 910 combines aspects of coarse pixel shading, as described in Vaidyanathan, Karthik, et. al., "Coarse Pixel Shading", High Performance Graphics, 2014, which is herein incorporated by reference in its entirety, with mip-mapped texture maps, linear efficient anti-aliased normal (LEAN) maps, and exponential variance shadow maps (EVSMs). The material and light shading techniques implemented by the foveated rendering algorithm address some of the shortcomings of the Coarse Pixel Shading technique described by Vaidyanathan when applied to HMDs that have large effective pixel sizes located close to a user's eyes that exaggerates image artifacts.

More specifically, visibility information for a tile of pixels is generated by the rasterizer. The rasterizer may generate a visibility map that indicates which pixels in a $T_x \times T_y$ sized pixel tile (e.g., 16×16 pixels) are covered by a particular geometric primitive, such as a triangle. The CPS shader 910 then shades the covered pixels based on a variable shading rate. The variable shading rate may be set to one color sample per pixel, one color sample per 2×2 pixel tile, one color sample per 4×4 pixel tile, or one color sample per 8×8 pixel tile, and so on. The CPS shader 910 is then run on each pixel or pixel tile, depending on the shading rate of the tile, that is covered, at least partially, by the triangle as defined by the visibility map. The CPS shader 910 utilizes one or more texture map(s) 904, one or more normal map(s) 906, and/or one or more shadow map(s) 908 to generate a sampled color value for the pixel or pixel tile according to the particular algorithm implemented by the CPS shader 910.

In one embodiment, the CPS shader 910 includes instructions configured to sample a mip-mapped texture map at a level-of-detail (LOD) calculated based on, at least in part, a variable shading rate corresponding with a sample location. A texture map 904 may be pre-filtered to produce a set of related texture maps at different resolutions (i.e., LOD), and then the texture map 904 is sampled at a particular level of detail based, at least in part, on the variable shading rate. Mip-mapping is described in more detail in Williams, Lance, "Pyramidal Parametrics", SIGGRAPH Comput. Graph., vol. 17, Number 3, 1983, which is herein incorporated by reference in its entirety.

For example, a base LOD is calculated for sampling the texture map based on a texel size corresponding with a pixel. The texel size refers to a texel footprint projected onto the pixel, which roughly refers to how many texels are covered per pixel in the current rasterized image space. This can change depending on the orientation of the texture map on the surface of the triangle relative to a screen space and/or the depth of the triangle as projected onto the screen space. The base LOD is then modified based on the variable shading rate for the pixel or pixel tile utilized during coarse pixel shading. For example, the base LOD may be used if the variable shading rate is one color sample per pixel; the base LOD may be incremented by one if the variable shading rate is one color sample per 2×2 pixel tile; the base LOD may be incremented by two if the variable shading rate is one color sample per 4×4 pixel tile; and the base LOD may be incremented by three if the variable shading rate is one color sample per 8×8 pixel tile, and so on. The color sample for the pixel or pixel tile is then generated by sampling the texture map 904 using texture coordinates for the pixel (or interpolated from multiple pixels over the pixel tile) at a particular level of detail in the mip-mapped texture specified by the modified LOD. In other words, generating a single color sample for one sample location associated with a plurality of pixels in a pixel tile may simply be performed by sampling the pre-filtered texture map at a particular level-of-detail.

In another embodiment, the CPS shader 910 includes instructions configured to sample a linear efficient anti-aliased normal (LEAN) map for calculating lighting effects. Bump maps or height fields are known in the prior art for applying texture to a surface such that light simulation is performed using a non-ideal surface for a geometric primitive (e.g., triangle). LEAN maps are utilized to encode bump normals projected onto a surface tangent frame and the second moments of the bump normal for a micro-facet structure. These values can be used to calculate a diffuse lighting component and/or a specular lighting component using known lighting simulation models, such as Blinn-Phong shading. The LEAN map can be pre-filtered using mip-mapping techniques since the second moments can be filtered using any linear filtering kernel. LEAN maps also enable the combination of multiple bump maps into a single LEAN map, which can be calculated and mip-mapped prior to the rendering pass. LEAN maps are described in more detail in Olano, Marc, et. al., "LEAN Mapping", Symposium on Interactive 3D Graphics and Games, 2010, pp. 181-188, which is herein incorporated by reference in its entirety.

The normal map 906, which is a LEAN map, may be sampled at various mip-mapped LOD to calculate light contributions from a lighting effect such as diffuse or specular lighting effects. In one embodiment, the CPS shader 910 includes instructions configured to sample the normal map 906 to find an average surface normal, projected in a surface tangent plane, in a particular region corresponding to a sample location. The average surface normal for the region is used to calculate a diffuse lighting contribution for the region. In another embodiment, the CPS shader 910 includes instructions configured to sample the normal map 906 to reconstruct a covariance matrix for the bump normal distribution in the region based on the second moments for the bump normal distribution for the region encoded in the normal map 906. In yet another embodiment, the CPS shader 910 includes instructions configured to sample the normal map 906 to calculate a specular contribution for the region.

In yet another embodiment, the CPS shader 910 includes instructions configured to calculate a diffuse lighting component of a color value for a sample location using the normal map 906 and calculate a specular lighting component of a color value for a sample location using a specular anti-aliasing (SAA) technique, as described in more detail below in conjunction with the description for FIGS. 11 through 13. Briefly, the SAA technique includes the steps of determining a pixel footprint associated with the sample location, transforming the pixel footprint into a slope domain region associated with a normal distribution function, and calculating an expected density of slopes within the slope domain region. The expected density of slopes is utilized to calculate the specular lighting component of the color value.

In yet another embodiment, the CPS shader 910 includes instructions configured to sample an exponential variance shadow map (EVSM) for calculating shadows. EVSMs are described in more detail in Lauritzen, A., "Rendering Antialiased Shadows Using Warped Variance Shadow Maps", Thesis presented to the University of Waterloo, 2008, which is herein incorporated by reference in its entirety. The shadow map 908 is an EVSM that encodes the shadow map for the scene geometry in light space by storing a distance from light and its second moment. For example, an EVSM is generated by rendering a depth map for the scene in a z-only pass based on the light position. While rendering, each depth sample is transformed into light space coordinates using a matrix transformation based on a location of a light source. Using the depth and its second moment from the EVSM, and an exponential bias, the amount of shadow received at a point is determined. Each EVSM shadow map may incorporate hardware MSAA, mip-mapping (i.e., filtering of the full-resolution shadow map to generate lower resolution shadow maps), and anisotropic filtering of the shadows to produce soft shadows.

The CPS shader 910 is utilized to generate an image with variable shading rates across the image, where the shading rate for a particular region (i.e., pixel or pixel tile) is based on the angular distance of the region to a fixation point. The shading rate may be calculated for each region based on a mapping of distance to FOV angle, which is itself dependent on the distance of the viewer to the display. In a HMD, this mapping may be constant as the viewer's eye is located at an approximately constant depth from the display. However, in a desktop display, where the viewer may move relative to the display, the mapping may be updated based on sensor feedback.

The resulting foveated image may still include various artifacts caused by varying the shading rate across the image. Rather than simply filtering the shading samples in the shading algorithm, which is partially accomplished using the techniques outlined above, a post-process anti-aliasing step is performed to reduce these artifacts. These post-process steps enable a more aggressive change in shading rate relative to eccentricity calculated based on the fixation point, which reduces the computational bandwidth requirements of the foveated rendering system while not adversely affecting perceived image quality.

The post-process anti-aliasing step may include performing temporal anti-aliasing (TAA) using variance clipping and clamping (VCC), which may be referred to herein more generally as variance sampling. Variance sampling is described in more detail in U.S. patent application Ser. No. 15/452,651 titled "Improved Method for Data Reuse and Applications to Spatio-Temporal Supersampling and De-Noising," filed Mar. 7, 2016, which is herein incorporated by reference in its entirety. Variance Sampling provides two major benefits. First, the axis aligned bounding box utilized for clamping or clipping the resolved color value tends to naturally exclude outliers, which reduces artifacts like ghosting that are noticeable even in the periphery of a foveated image. Second, the raw moments of a color distribution are linear and can be pre-filtered over variable-sized image regions (e.g., mip-mapping), which enables multi-scale TAA implementations that can efficiently determine the statistical properties of large and under-sampled image regions.

The TAA algorithm 920 processes the foveated image for the current frame generated by the CPS shader 910, blending the image for the current frame with resolved pixel colors from a previous frame that have been clamped/clipped based on an AABB generated according to a distribution of color samples in the current frame. In one embodiment, the TAA algorithm 920 incorporates an improvement to variance sampling to account for saccadic eye movement. Eye saccades are rapid eye movements that change the point of fixation such that the brain can resolve different parts of a scene using the fovea. In other words, a viewer's eye will rapidly move from one point of the scene to another as the viewer processes the different objects in the scene. Consequently, the fixation point measured by the sensors 730 or 832/834 will move from a first point in the previous frame to a second point in the current frame. The color information from the previous frame is combined with color information from the current frame when utilizing the TAA algorithm 920 and, therefore, it is possible that the fixation point in the current frame is associated with a location in the periphery of the previous frame, relative to the fixation point in the previous frame, such that color information of particular pixels in the current frame that were rendered at one shading rate would be blended with color information of corresponding pixels in the previous frame that were rendered at a different shading rate associated with a blurred portion of the image in the previous frame. The effect is that the blended image will slowly come into focus over a number of frames as the lower resolution color information of the previous frames is modulated by the high resolution color information of one or more new frames.

In one embodiment, saccade detection and recovery is implemented in the TAA algorithm 920. To eliminate focus lag caused by the variable shading rate across images blended using the CPS shader 910, the blending rate $\alpha$ is increased locally to accelerate the rate of convergence in the region around the fixation point in the current frame. The value of the blending rate $\alpha$ is given by the following equations:

$$\alpha' = \omega \cdot \alpha_{max} + (1 - \omega) \cdot \alpha, \quad \text{(Eq. 1)}$$

$$S_r = \frac{S_{t-1} - S_t}{S_{max}} \quad \text{(Eq. 2)}$$

$$\omega = \begin{cases} 1, & \text{if } S_r > 1 \\ 0, & \text{if } S_r < 0 \\ S_r, & \text{otherwise} \end{cases} \quad \text{(Eq. 3)}$$

where $\alpha_{max}$ is the maximum value of the blending rate $\alpha$, and $\omega$ is an acceleration rate in Equation 1; and $S_t$ is the normalized shading rate for a pixel in the current frame, $S_{t-1}$ is the normalized shading rate for a corresponding pixel in the previous frame, and $S_r$ is a normalized shading ratio calculated by dividing the difference of the normalized shading rate for a pixel in the current frame and the normalized shading rate for a corresponding pixel in the previous frame by a maximum shading rate $S_{max}$ in Equation 2. It will be appreciated that the shading rates may be normalized to take a value in the range of (0,1], where the shading rate at the fovea is assigned a value of one and lower shading rates a take values less than one. For example, the shading rate at the fovea may be set to a resolution of one color sample per pixel, which is assigned a normalized shading rate value of 1. As pixel tiles move into the periphery of the image, the shading rate may be changed to one color sample per 2×2 pixel tile, which is assigned a value of 0.5. As pixel tiles move even further into the periphery of the image, the shading rate may be changed to one color sample per 4×4 pixel tile, which is assigned a value of 0.25, and so forth. Each shading rate step increases the size of a corresponding pixel tile for which one color sample is generated by double in both a horizontal and vertical direction, and the corresponding normalized shading rate is reduced by half. In one embodiment, for optimal results $S_{max}$ is set equal to 0.25 and $\alpha_{max}$ is set equal to 0.33, which guarantees a rapid convergence to the correct image in the area proximate the fixation point. It will be appreciated by evaluating Equation 2 that acceleration the blending rate α only occurs when $S_{t-1} > S_t$, meaning that the blending rate is not accelerated when $S_{t-1} < S_t$. This is because there is no need to change the TAA algorithm in the periphery of the current frame to rapidly blur the image in the periphery when the corresponding portion of the image in the previous frame was rendered using a higher relative shading rate.

In one embodiment, the shading rate utilized to render each pixel may be stored in the frame buffer along with the color components for the pixel. For example, the shading rate can be stored in an RGBA format frame buffer, utilizing the RGB channels to store the color sample information for the pixel and the alpha channel to store the shading rate. In another embodiment, the shading rate may be stored in a separate render target (i.e., data structure) in a memory and accessed in parallel with the frame buffer storing the color information for the image. The shading rate information may be accessed by the TAA algorithm 920 when blending the current frame with the previous frame.

Finally, once the foveated image for the current frame is blended with the foveated image for the previous frame, the resulting blended image is filtered using a contrast-enhancing filter (CEF) 930. The CEF 930 enhances the contrast in the blended image to reduce artifacts introduced by the foveated rendering algorithm. In one embodiment, the CEF 930 is based on a variance interpretation of the contrast and computes a variance of the local luminance in the periphery of the image first, followed by scaling the colors to enhance the variance. An example of a contrast enhancing filter is described in more detail in Grundland, Mark, et. al., "Cross Dissolve without Cross Fade: Preserving Contrast, Color and Salience in Image Compositing", Computer Graphics Forum, vol. 25, No. 3, 2006, which is herein incorporated by reference in its entirety. More specifically, the CEF 930 is a linear redistribution of colors around a mean of a color distribution given as:

$$C'_p = \tau \sigma_p (C_p - \mu_p) + \mu_p, \quad \text{(Eq 4)}$$

where τ is a parameter controlling the amount of contrast enhancement with default τ=1; $C_p$ is the color of pixel p in the foveated image; $\mu_p$ is a mean of a color distribution in a kernel window centered on the pixel p; $\sigma_p$ is a variance of the color distribution in the kernel window; and $C'_p$ is the contrast-enhanced color for the pixel p. In one embodiment, the variance $\sigma_p$ may be replaced by a simplifying constant, e.g., 1. In another embodiment, the parameter τ may be adjusted based on the shading rate. Consequently, the contrast enhancing filter can be applied disproportionately to the periphery of the image, leaving the portion of the image proximate the fixation point unfiltered. This helps alleviate the artifacts introduced in the periphery of the image by the foveated rendering algorithm while not changing the contrast near the fixation point which is rendered using the highest resolution shading rate. The CEF 930 generates a filtered foveated image 904 that is then presented on the display(s) 720 or 822/824.

Figure 10:
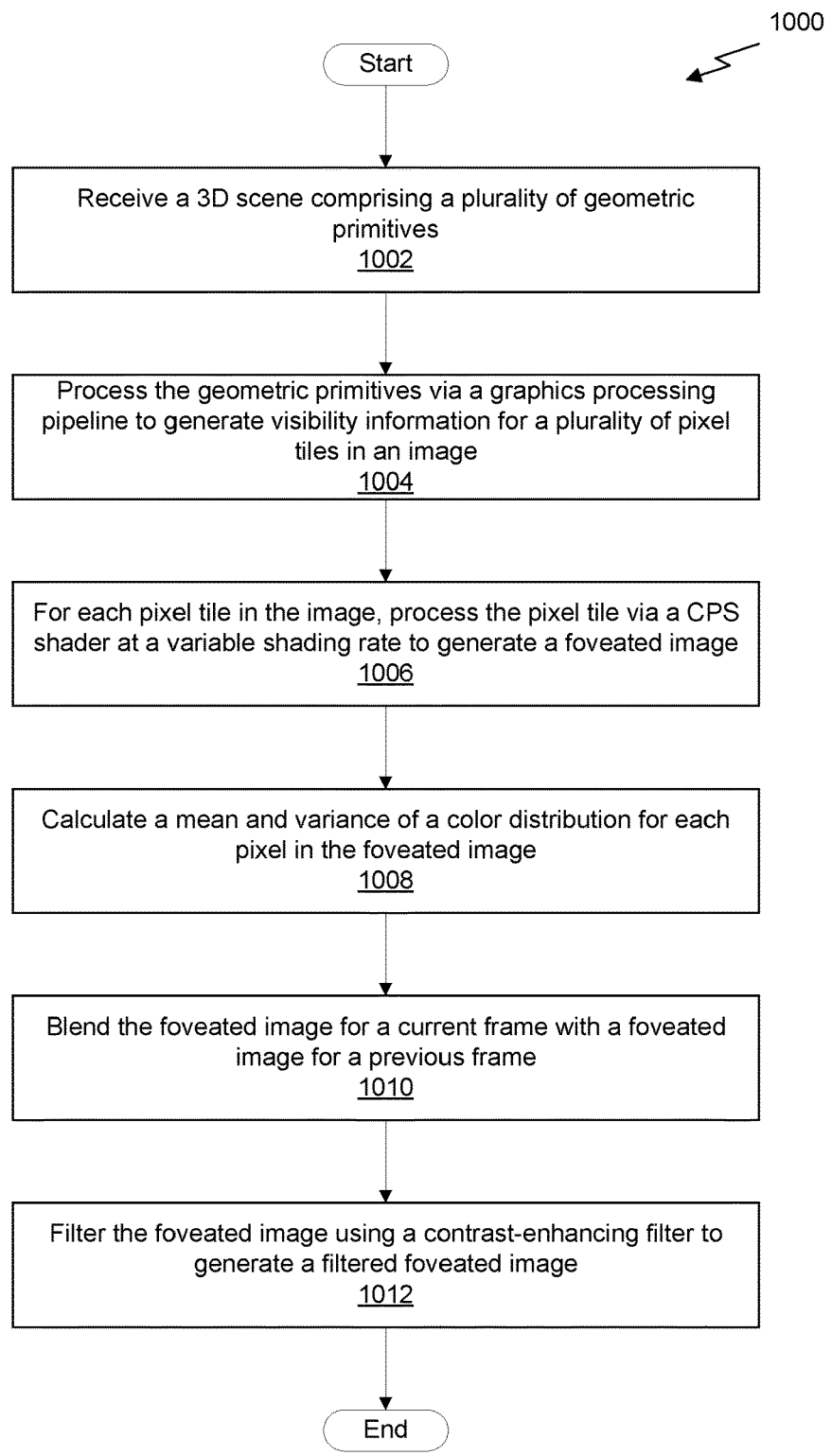
FIG. 10 illustrates a flowchart of a method for generating a filtered foveated image, in accordance with one embodiment.

FIG. 10 illustrates a flowchart of a method 1000 for generating a filtered foveated image, in accordance with one embodiment. It will be appreciated that the method 1000 is described within the scope of software executed by a processor; however, in some embodiments, the method 1000 may be implemented in hardware or some combination of hardware and software. The method 1000 begins at step 1002, where a 3D scene is received. The 3D scene may comprise a plurality of geometric primitives associated with a 3D model. At step 1004, the geometric primitives are processed by a graphics processing pipeline to generate visibility information for a plurality of pixel tiles in the image. Visibility information may be generated at a fixed rendering rate of N samples per pixel in a $T_x \times T_y$ sized pixel tile.

At step 1006, for each pixel tile in the image, the pixel tile is processed by a CPS shader 910 at a variable shading rate to generate a foveated image. The variable shading rate is calculated based on a distance of the pixel tile to a fixation point in the image. The fixation point may be established based on sensor feedback from a foveated rendering system such as system 700 or system 800. The CPS shader 910 may include instructions configured to sample a mip-mapped texture map at a LOD calculated based on, at least in part, a variable shading rate corresponding with a sample location. The CPS shader 910 may include instructions configured to sample a linear efficient anti-aliased normal (LEAN) map for calculating lighting effects. For example, the LEAN map may be sampled at a LOD to generate an average surface normal for a region in order to calculate a diffuse lighting component of a color sample for the region. As another example, the LEAN map may be sampled at a LOD to reconstruct a covariance matrix corresponding to a bump distribution for the region in order to calculate a specular lighting component of a color sample for the region. Alternatively, the specular lighting component of the color sample may be calculated using the SAA technique.

At step 1008, a mean and variance of a color distribution for a pixel in the foveated image is calculated. The filter window may be, e.g., a N×N pixel window that calculates a mean of the color distribution from all color values in the filter window and a variance of the color distribution based on the differences of the color values in the filter window with the mean of the color distribution in the filter window. The mean and variance values for each pixel may be stored in a texture map.

At step 1010, the image for a current frame is blended with an image for a previous frame in a temporal anti-aliasing scheme that incorporates a variance sampling technique. In one embodiment, the variance of the color distribution for a pixel in the foveated image for a current frame is used to construct an AABB in a color space that is applied to clamp or clip resolved color samples from a previous frame during blending of the previous frame with the current frame. In one embodiment, saccade detection and recovery is used to accelerate the blending rate in areas proximate the fixation point for pixels that changed shading rate between the previous frame and the current frame.

At step 1012, the foveated image is filtered using a contrast-enhancing filter to generate a filtered foveated image. The contrast enhancing filter may use the mean and variance of the color distribution for each pixel to calculate a contrast enhanced color for the pixel. After step 1012, the method 1000 terminates.

Figure 11:
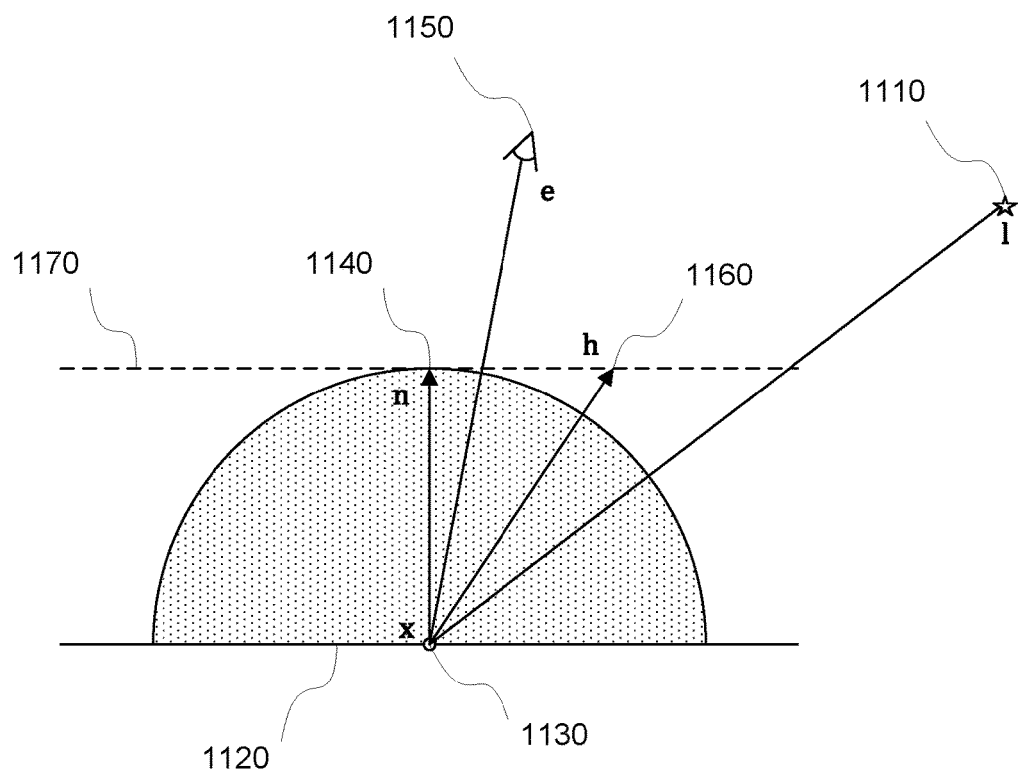
FIG. 11 illustrates a micro-facet model for light scattering simulation, in accordance with one embodiment.

FIG. 11 illustrates a micro-facet model for light scattering simulation, in accordance with one embodiment. Modern rendering algorithms commonly use micro-facet based surface scattering models as the basis for material appearance. However, specular aliasing may occur when these models are under-sampled, and other artifacts may result due to minification (i.e., when the model of a surface is sub-pixel sized). Reflection and transmission of light through a surface can be modeled using a Bidirectional Scattering Distribution Function (BSDF) which maps how much irradiance of a light source from a particular incoming direction is scattered in an outgoing direction. The BSDF depends largely on the geometry of the underlying surface that is being modeled, which may be specified as a height field or a plurality of micro-facet structures (e.g., a distribution of bump normals). The micro-facet structures may each comprise a surface having a surface normal in a particular direction. Consequently, a surface can also be modeled as a distribution of surface normals of the micro-facet structures that make up the surface. The distribution of surface normals can take the form of a normal distribution function (NDF) over a given region, such as a pixel. One common NDF is the Beckman NDF, which assumes to approximate a height field of micro-facets having a height distributed according to a bivariate Gaussian distribution. Another common NDF was proposed by Trowbridge and Reitz, commonly referred to as GGX, which corresponds to a distribution of slopes on an ellipsoid and provides a closer match for some materials.

As shown in FIG. 11, a light source l 1110 is projected onto a surface 1120 at point x 1130. The surface 1120 has a surface normal n 1140. Light from the light source 1110 is reflected off the surface in various directions based on the micro-facet model, which assumes that the surface 1120 causes scattering based on the underlying micro-facet structure of the surface, which is denoted by a distribution of surface normals. When rendering a scene, the rendering algorithm is configured to calculate the irradiance of light scattered from the surface 1120 towards an eye e 1150 (e.g., a virtual camera position). The BSDF models the irradiance based on the direction of the ray from the light source 1110 to the point x 1130 on surface 1120, and the direction of the ray from the point x 1130 on the surface 1120 to the eye e 1150, and is given as:

$$f_s(i, o) = \frac{F(i, o)D(m)G(i, o, m)}{4|i \cdot n||o \cdot n|}, \quad \text{(Eq. 5)}$$

where i is a vector from the light source 1110 to the point x 1130, o is a vector from the point x 1130 to the eye e 1150, function F is a Fresnel term, function D is the NDF of the normals for the micro-facet structure for the surface, function G is a masking-shadowing term, n is the surface normal, and m is a half-way vector between i and o. The NDF D(m) is defined as the probability of having a slope direction m in a slope field defined for a surface patch A, as given by:

$$D(m) = \frac{dA(m)}{Adm}, \quad \text{(Eq. 6)}$$

where the area of A is defined as a unit value (A=1), by convention, and dA(m) is the area of all slopes with direction m. A modification to Equation 6 may be made by using an alternate notation where the NDF D (b) is defined in a domain of slopes with:

$$b = \frac{m_{xy}}{m_z}, \quad \text{(Eq. 7)}$$

where b is a projection of slope m onto a parallel plane 1170 located one unit away from the surface along the normal n 1140. Even though the change of notation requires a corresponding Jacobian matrix to be multiplied by Equation 5, the Jacobian can be omitted until later to keep notation clear.

Transformation from path space (i, o) to a half vector space h is used to simplify filtering of the NDFs. The half vector h 1160 is used to sample the NDF in a local shading tangent space and is defined as:

$$h(x) = T(x)\frac{i(x) + o(x)}{|n(x) \cdot (i(x) + o(x))|}, \quad \text{(Eq. 8)}$$

where $T(x)=(s, t, n)^T$ is a matrix formed by the basis vectors of the orthonormal shading frame at x.

The goal of filtering the NDF is to evaluate the light transport at point x 1130 for any incident angle of light on the surface at x 1130 to the eye e 1150. However, when rendering a pixel, the location of x, and therefore the corresponding direction of the half vector h 1160, may change significantly over the pixel footprint. If the rendering algorithm simply samples a single point x within the pixel footprint, sources of specular highlight may be missed and the resulting color calculated for the pixel may be significantly off from an expected value. In addition, small changes over the course of multiple frames may result in flickering from sampling different points x within the pixel footprint. Consequently, the calculation of a specular highlight should be performed by integrating the NDF over the domain of the pixel footprint, which can be approximated by integrating over the half-vector space using a first-order Taylor approximation:

$$h(x+\Delta x)=h(x)+\Delta x M(x)+o(\Delta x), \quad \text{(Eq. 9)}$$

In other words, a first-order change in a half-vector domain can be estimated by the change of point x using a Jacobian matrix M given as:

$$M(x) = \frac{dh}{dx} = \begin{pmatrix} \frac{\delta h_s}{\delta x_s} & \frac{\delta h_s}{\delta x_t} \\ \frac{\delta h_t}{\delta x_s} & \frac{\delta h_t}{\delta x_t} \end{pmatrix} \quad \text{(Eq. 10)}$$

where *s and *t are the scalar components of a vector along the corresponding vectors s and t of the orthonormal shading frame. Techniques for deriving the Jacobian matrix M are described in more detail in Jakob, Wenzel., "Light Transport on path-space manifolds", PhD thesis, Cornell University, 2013, which is herein incorporated by reference in its entirety. The Jacobian matrix M can be derived from Equation 8 as:

$$M(x)=h'(x)=T(x)h'_w(x)+T'(x)h_w(x), \quad \text{(Eq. 11)}$$

where $h_w$ is the half-vector projected onto a parallel plane of the tangent frame in the world space, as given as the fractional portion of Equation 8 and T'(x) is a 2×2×2 tensor derivative of the 2×2 tangent vector T(x).

Figure 12A:
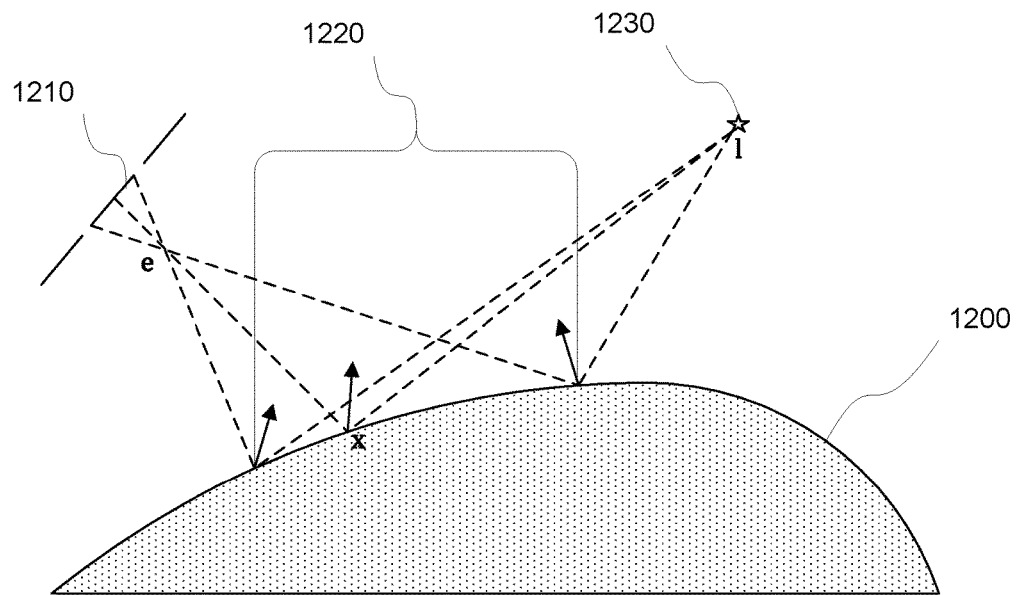
FIGS. 12A & 12B illustrate a technique for filtering NDFs for direct lighting simulation, in accordance with one embodiment.
Figure 12B:
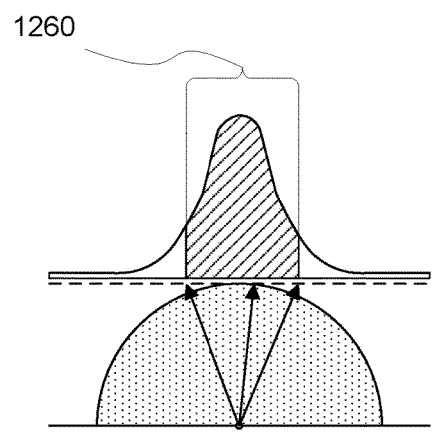

FIGS. 12A & 12B illustrate a technique for filtering NDFs for direct lighting simulation, in accordance with one embodiment. The NDF of an advanced material, such as a normal-mapped or displacement-mapped geometry with complex appearance, may be subject to aliasing when rendered depending on the sampling frequency of the rendering algorithm applied to that material. Consequently, when rendering a surface using an NDF-based model, care must be taken when sampling the surface to avoid aliasing artifacts. One technique for reducing such aliasing artifacts involves filtering NDFs for different scales or pixel footprints. This can be performed efficiently, for variable sized pixel footprints, in a half vector space.

In the general case, in order to compute the incident flux of light on a pixel reflected off a surface, a light transport integral can be evaluated. In one embodiment, the light transport integral is given as:

$$I = \int_{\mathcal{F}} W(e,x) \mathcal{G}(e,x) f_s(e,x,l) \mathcal{G}(l,x) L_e(l,x) dx \quad (Eq. 12)$$

where $\mathcal{F}$ is the pixel footprint, $W(e, x)$ is the responsivity of the image sensor in direction $\overline{ex}$, $\mathcal{G}(a, b)$ is a geometric term between vertices a and b, $L_e(l, x)$ is the radiance emitted from the light source towards $\overline{lx}$, and $f_s$ is the BSDF at point x evaluated with directions $o=\overline{xe}$ and $i=\overline{xl}$. A far field approximation may be taken that states that the distance from the object to the eye is much larger than the size of the pixel footprint and, as a result, the length of i and o can be approximated as constants in Equation 12. This assumption allows Equation 11 to be simplified as:

$$I = C_p \int_{\mathcal{F}} f_s(e,x,l) dx, \quad (Eq. 13)$$

where $C_p$ is a path constant, which can be estimated to simplify the integral. Substituting in a BSDF from Equation 1, Equation 13 can be rewritten as:

$$I = C \int_{\mathcal{F}} D(h(x)) dx, \quad (Eq. 14)$$

where $h(x)$ is the half-vector given as a function of point x in the spherical domain. The integral can be transformed into the pixel footprint in the slope domain region $\mathcal{P}$ as:

$$\int_{\mathcal{F}} D(h(x)) dx \approx \int_{\mathcal{P}} D(h) \left| \frac{dx}{dh} \right| dh \approx |\mathcal{F}| \frac{1}{|\mathcal{P}|} \int_{\mathcal{P}} D(h) dh, \quad (Eq. 15)$$

where $dx/dh = M$ is assumed to be constant, and $|\mathcal{P}| = |M| |\mathcal{F}|$ by construction. This approximation is valid within a small error under the assumption that the mapping from the pixel footprint $\mathcal{F}$ to the slope domain region $\mathcal{P}$ is a bijection. Similar to an NDF, the integral of Equation 15 computes an effective area of reflective microfacets, except over the macro region $\mathcal{F}$. It will be appreciated that since the NDF D does not depend on x, the integral over the pixel footprint $\mathcal{F}$ collapses to the area of $\mathcal{F}$, which can be computed implicitly during sampling. In other words, we can substitute the NDF in Equation 14 with a pre-filtered value over the pixel footprint in the slope domain:

$$\tilde{D}(\mathcal{P}) = E_\mathcal{P}[D(h)] = \frac{1}{|\mathcal{P}|} \int_{\mathcal{P}} D(h) dh \quad (Eq. 16)$$

The pre-filtered value over the pixel footprint in the slope domain region $\mathcal{P}$ 1260 is shown in FIG. 12B. This integral provides an expected density of micro-facets oriented within the slope domain region $\mathcal{P}$, which allows shading to be performed at a single point, while using an NDF that was filtered over an entire pixel footprint $\mathcal{F}$. Equation 16 can be interpreted as a convolution with a constant normalized kernel $K_\mathcal{P} = 1_\mathcal{P} / |\mathcal{P}|$ (with a support of $\mathcal{P}$ shape and a value of one over the area of $\mathcal{P}$) and then evaluated at zero as:

$$\tilde{D}(\mathcal{P}) = \int_{\mathbb{R}^2} K_\mathcal{P}(h) D(h) dh = K_\mathcal{P} * D \quad (Eq. 17)$$

The resulting convolution with an effective NDF kernel is utilized to approximate the kernel $K_p$ to obtain a closed-form filtering solution for some NDFs.

As shown in FIG. 12A, the pixel footprint $\mathcal{F}$ 1220 is determined for a pixel 1210 using techniques such as raytracing. In one embodiment, a standard technique, such as ray differentials, as described in more detail in Igehy, Homan, "Tracing Ray Differentials", SIGGRAPH, 1999, pp. 179-186, which is herein incorporated by reference in its entirety, may be utilized to project the variation of directions from the pixel 1210 a surface vertex x on a surface 1200. The variation of directions can be represented as two vectors, $\Delta x_u$ and $\Delta x_v$ on a tangent plane of the surface corresponding to the horizontal and vertical pixel steps in the uv image. These differentials are then transformed into half-vector space based on the Jacobian matrix M, as given by:

$$\Delta h_u = \Delta x_u M$$

$$\Delta h_v = \Delta x_v M' \quad (Eq. 18)$$

where $\Delta h_u$ and $\Delta h_v$ are first-order variations in the slope domain. The parallelogram in the slope domain region $\mathcal{P}$ given by these two vectors is used to filter high-frequency NDFs.

In order to make filtering NDFs practical, an efficient way to compute the integral of Equation 16 is needed. Solutions for solving Equation 16 for two common NDFs, the Beckman NDF and the Trowbridge-Reitz NDF, are discussed in more detail below.

In one embodiment, surfaces are modeled using Beckman NDFs. The Beckman NDFs are scaled versions of bivariate Gaussian distributions in the slope domain. Assuming that the pixel reconstruction filter is a 2D Gaussian filter in image space with a standard deviation of half a pixel, the vectors $\Delta h_u$ and $\Delta h_v$ represent the vectors of a standard deviation of the 2D Gaussian distribution tracked from image space into the slope domain. Equation 17 is utilized to convolve the two 2D Gaussian distributions in the slope domain by summing up the covariance matrices of the 2D Gaussians. In order to obtain a covariance matrix from two standard deviation vectors, a quadratic matrix form is used to square the full matrix composed of the two standard deviation vectors, as given by:

$$P = \begin{pmatrix} \Delta h_u \\ \Delta h_v \end{pmatrix} \begin{pmatrix} \Delta h_u \\ \Delta h_v \end{pmatrix}^T \quad (Eq. 19)$$

Given an anisotropic Beckman NDF with roughness values $\alpha_s$ and $\alpha_t$ along tangent axes, the covariance matrix of the NDF is written as:

$$B = \begin{pmatrix} \alpha_s^2/2 & 0 \\ 0 & \alpha_t^2/2 \end{pmatrix}, \quad (Eq. 20)$$

where the roughness parameter a of a Beckman NDF is related to the standard deviation of a Gaussian distribution by $\alpha^2 = 2\sigma^2$. The filtered NDF is then calculated by convolving the Beckman NDF with the 2D Gaussian image filter projected into the slope domain. Both distributions are Gaussians, so the convolution is another 2D Gaussian with a covariance matrix B', which is a sum of the covariance matrices:

$$B' = B + P \quad \text{(Eq. 21)}$$

In another embodiment, surfaces are modeled using Trowbridge-Reitz NDFs. The Trowbridge-Reitz NDFs do not have an elegant closed-form convolution and, therefore, an ad hoc integration method is used to filter the Trowbridge-Reitz NDFs. More specifically, the integral of Equation 14 can be simplified by circumscribing an axis-aligned bounding rectangle $\mathcal{R}$ around the parallelogram filtering region with corresponding scalar ranges $\Delta h_s$ and $\Delta h_t$ along the s and t axes. Consequently, the integral of Equation 16 can be decomposed as:

$$D(\mathcal{P}) \approx D(\mathcal{R}) = \frac{1}{|\Delta h_s \Delta h_t|} \int_{h_s - \frac{\Delta h_s}{2}}^{h_s + \frac{\Delta h_s}{2}} \int_{h_t - \frac{\Delta h_t}{2}}^{h_t + \frac{\Delta h_t}{2}} D(s, t) ds dt, \quad \text{(Eq. 22)}$$

where integration is performed over an axis-aligned rectangle $\mathcal{R}$ in s, t and the argument h for the NDF D (h) is formed out of two scalar values $h_s$ and $h_t$ in the slope domain.

Figure 13:
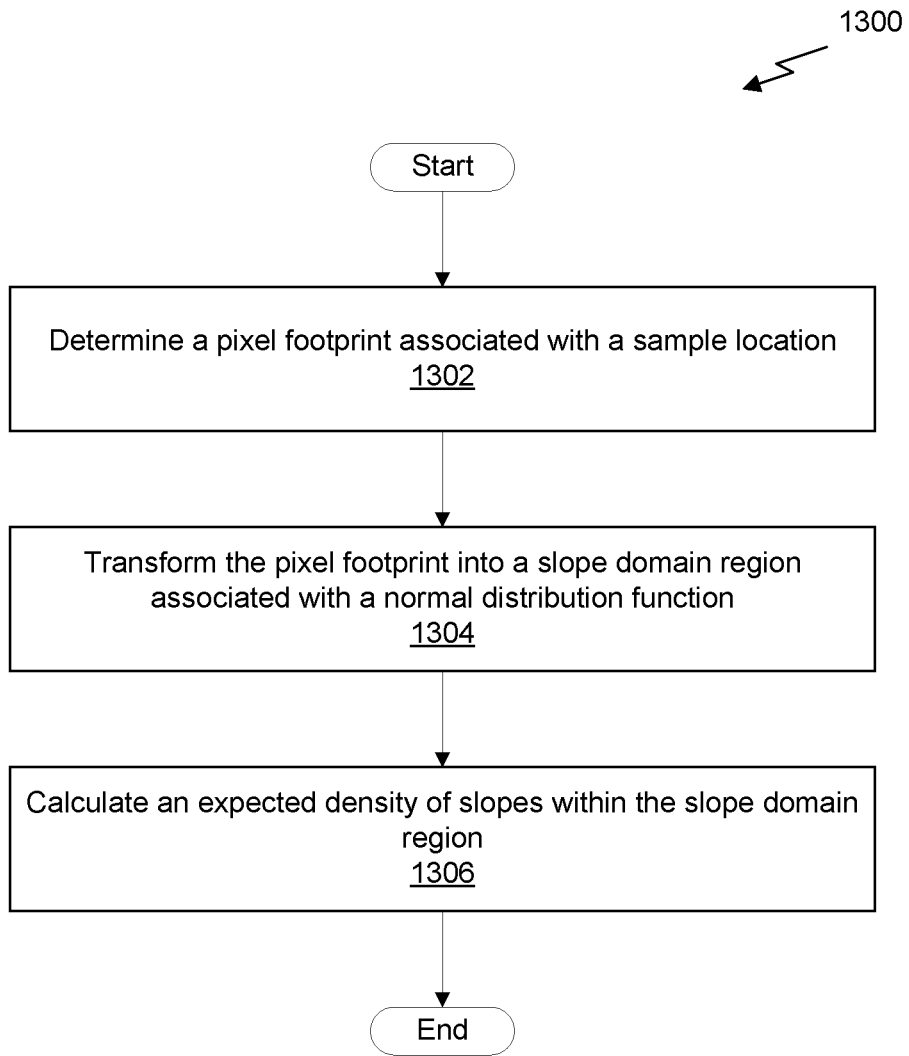
FIG. 13 illustrates a flowchart of a method for calculating a specular highlight component of a color value for a sample location, in accordance with one embodiment.

FIG. 13 illustrates a flowchart of a method 1300 for calculating a specular highlight component of a color value for a sample location, in accordance with one embodiment. It will be appreciated that the method 1300 is described within the scope of software executed by a processor; however, in some embodiments, the method 1300 may be implemented in hardware or some combination of hardware and software. The method 1300 begins at step 1302, where a pixel footprint $\mathcal{F}$ associated with a sample location x is determined. A pixel is defined in a uv image domain, where u is a horizontal direction in a 2D array of pixels and v is a vertical direction in the 2D array of pixels. The pixel footprint $\mathcal{F}$ may be specified as two differential vectors $\Delta x_u$ and $\Delta x_v$ that indicate the change in x over a horizontal and vertical pixel step, respectively. At step 1304, the pixel footprint $\mathcal{F}$ is transformed into a slope domain region $\mathcal{P}$ associated with a normal distribution function D. The transformation of the pixel footprint may be implemented by multiplying the differential vectors $\Delta x_u$ and $\Delta x_v$ by a Jacobian matrix M as illustrated by Equation 18.

At step 1306, an expected density of slopes within the slope domain region $\mathcal{P}$ is calculated. The expected density of slopes may be calculated by solving the integral of Equation 16. In one embodiment, when the NDF is a Beckman NDF, the integral solution is approximated by convolving the Beckman NDF with a 2D Gaussian image filter projected into the slope domain. The vectors $\Delta h_u$ and $\Delta h_v$ represent the vectors of a standard deviation of this 2D Gaussian distribution projected from the image space into the slope domain. Convolving the two distributions is performed by summing the covariance matrices for the distributions, as shown in Equations 19 through 21. In another embodiment, when the NDF is a Trowbridge-Reitz NDF, the integral solution is approximated by circumscribing an axis-aligned bounding rectangle $\mathcal{R}$ around the parallelogram formed by the vectors $\Delta h_u$ and $\Delta h_v$, and decomposing the integral from Equation 16 as shown in Equation 22. The solution to Equation 16 is approximated by solving the integral of Equation 22 in the rectangle $\mathcal{R}$ formed by vectors $\Delta h_s$ and $\Delta h_t$, where $h_s$ and $h_t$ are scalar values for the half-vector h at sample location x.

Figure 14:
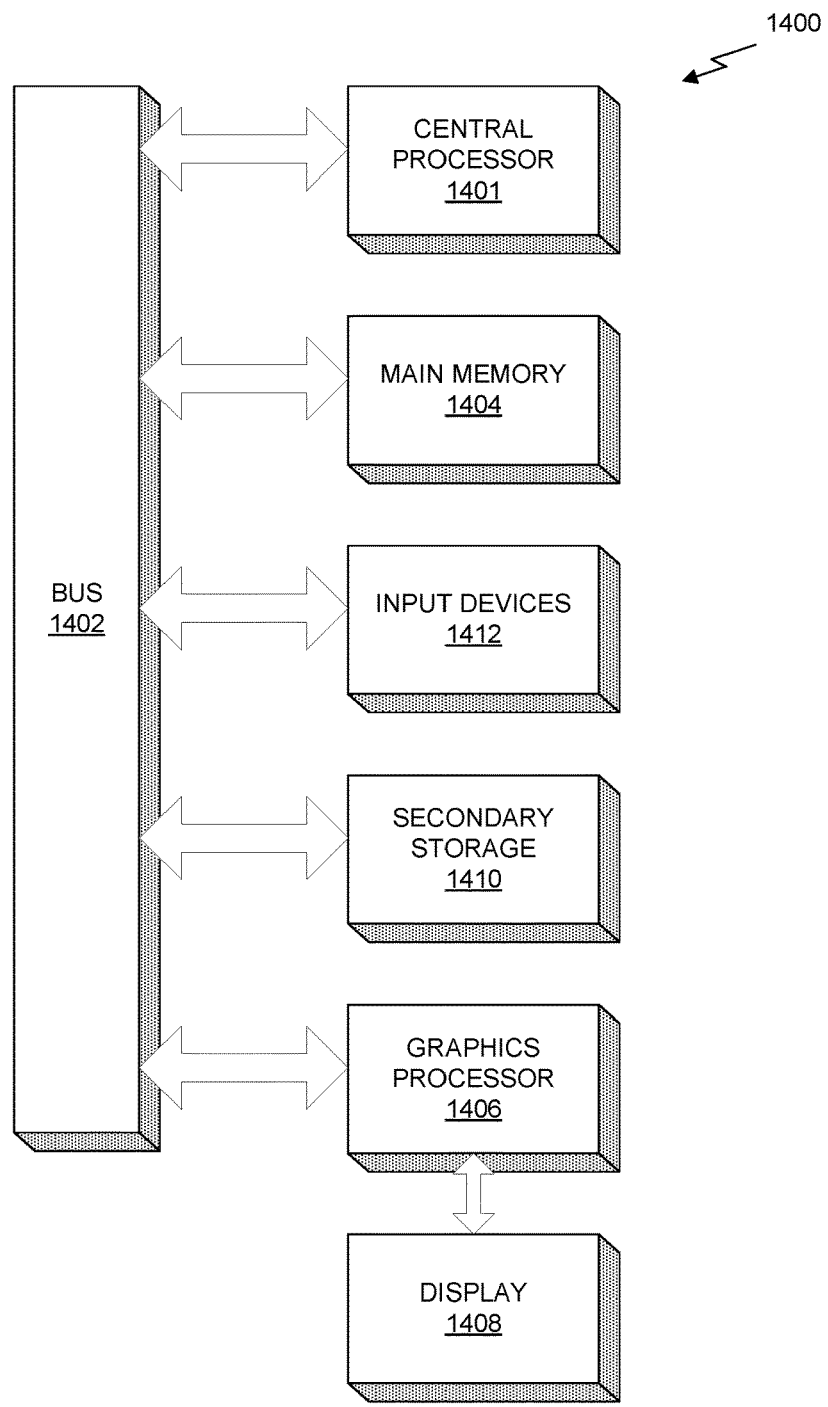
FIG. 14 illustrates an exemplary system in which the various architecture and/or functionality of the various previous embodiments may be implemented.

FIG. 14 illustrates an exemplary system 1400 in which the various architecture and/or functionality of the various previous embodiments may be implemented. As shown, a system 1400 is provided including at least one central processor 1401 that is connected to a communication bus 1402. The communication bus 1402 may be implemented using any suitable protocol, such as PCI (Peripheral Component Interconnect), PCI-Express, AGP (Accelerated Graphics Port), HyperTransport, or any other bus or point-to-point communication protocol(s). The system 1400 also includes a main memory 1404. Control logic (software) and data are stored in the main memory 1404 which may take the form of random access memory (RAM).

The system 1400 also includes input devices 1412, a graphics processor 1406, and a display 1408, i.e. a conventional CRT (cathode ray tube), LCD (liquid crystal display), LED (light emitting diode), plasma display or the like. User input may be received from the input devices 1412, e.g., keyboard, mouse, touchpad, microphone, and the like. In one embodiment, the graphics processor 1406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1400 may also include a secondary storage 1410. The secondary storage 1410 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1404 and/or the secondary storage 1410. Such computer programs, when executed, enable the system 1400 to perform various functions. The memory 1404, the storage 1410, and/or any other storage are possible examples of computer-readable media.

In one embodiment, the architecture and/or functionality of the various previous figures may be implemented in the context of the central processor 1401, the graphics processor 1406, an integrated circuit (not shown) that is capable of at least a portion of the capabilities of both the central processor 1401 and the graphics processor 1406, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1400 may take the form of a desktop computer, laptop computer, server, workstation, game consoles, embedded system, and/or any other type of logic. Still yet, the system 1400 may take the form of various other devices including, but not limited to a personal digital assistant (PDA) device, a mobile phone device, a television, etc.

Further, while not shown, the system 1400 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving a three-dimensional scene;
rendering the 3D scene according to a foveated rendering algorithm to generate a foveated image; and
filtering the foveated image using a contrast-enhancing filter to generate a filtered foveated image, wherein the contrast-enhancing filter comprises, for each pixel p in the foveated image, calculating a contrast-enhanced color $C'_p$ based on a variance of a color distribution of at least two color values in a kernel window centered on the pixel p, and a difference between the color value, $C_p$, of the pixel p, and a mean of the color distribution of the at least two color values in the kernel window.

2. The method of claim 1, further comprising displaying the filtered foveated image on a gaze-tracking display, wherein the gaze-tracking display includes one or more sensors for determining a fixation point of a viewer, and wherein the fixation point is provided as input to the foveated rendering algorithm.

3. The method of claim 1, wherein the foveated rendering algorithm is implemented as a coarse pixel shading (CPS) shader executed by a parallel processing unit.

4. The method of claim 3, wherein the CPS shader includes instructions configured to sample a mip-mapped texture map at a level-of-detail (LOD) calculated based on, at least in part, a variable shading rate corresponding with a sample location.

5. The method of claim 3, wherein the CPS shader includes instructions configured to sample a linear efficient anti-aliased normal (LEAN) map for calculating lighting effects.

6. The method of claim 3, wherein the CPS shader includes instructions configured to sample an exponential variance shadow map (EVSM) for calculating shadows.

7. The method of claim 3, wherein variance sampling is performed to blend the foveated image for a current frame with a foveated image for a previous frame prior to the filtering.

8. The method of claim 1, wherein the contrast-enhanced color $C'_p$ for the pixel is computed according to an equation:

$$C'_p = \tau \sigma_p (C_p - \mu_p) + \mu_p,$$

where $\tau$ is a parameter controlling the amount of contrast enhancement; $\mu_p$ is the mean of the color distribution; and $\sigma_p$ is the variance of the color distribution.

9. The method of claim 8, wherein the equation is simplified by replacing the variance $\sigma_p$ with a constant.

10. A method, comprising:
receiving a three-dimensional scene; and
rendering the 3D scene according to a foveated rendering algorithm to generate a foveated image, wherein the foveated rendering algorithm is implemented as a coarse pixel shading (CPS) shader executed by a parallel processing unit and the CPS shader includes instructions configured to calculate a specular lighting component of a color value for a sample location by:
determining a pixel footprint associated with the sample location;
transforming the pixel footprint into a slope domain region associated with a normal distribution function; and
calculating an expected density of slopes within the slope domain region.

11. A method, comprising:
receiving a three-dimensional scene; and
rendering the 3D scene according to a foveated rendering algorithm to generate a foveated image, wherein the foveated rendering algorithm is implemented as a coarse pixel shading (CPS) shader executed by a parallel processing unit; and
filtering the foveated image using a contrast-enhancing filter to generate a filtered foveated image, wherein variance sampling is performed to blend the foveated image for a current frame with a foveated image for a previous frame prior to the filtering and the variance sampling incorporates saccade detection and recovery to adjust a blending rate.

12. A system, comprising:
a memory; and
a processor coupled to the memory, the processor configured to:
receive a three-dimensional scene,
render the 3D scene according to a foveated rendering algorithm to generate a foveated image, and
filter the foveated image using a contrast-enhancing filter to generate a filtered foveated image, wherein the contrast-enhancing filter comprises, for each pixel p in the foveated image, calculating a contrast-enhanced color $C'_p$ based on a variance of a color distribution of at least two color values in a kernel window centered on the pixel p, and a difference between the color value, $C_p$, of the pixel p, and a mean of the color distribution of the at least two color values in the kernel window.

13. The system of claim 12, the processor further configured to display the filtered foveated image on a gaze-tracking display, wherein the gaze-tracking display includes one or more sensors for determining a fixation point of a viewer, and wherein the fixation point is provided as input to the foveated rendering algorithm.

14. The system of claim 13, wherein the foveated rendering algorithm is implemented as a coarse pixel shading (CPS) shader executed by the processor, and wherein the processor is a parallel processing unit.

15. The system of claim 14, wherein the CPS shader includes instructions configured to sample a mip-mapped texture map at a level-of-detail (LOD) calculated based on, at least in part, a variable shading rate corresponding with a sample location.

16. The system of claim 14, wherein the CPS shader includes instructions configured to sample a linear efficient anti-aliased normal (LEAN) map for calculating lighting effects.

17. The system of claim 12, wherein the contrast-enhanced color $C'_p$ for the pixel is computed according to an equation:

$$C'_p = \tau \sigma_p (C_p - \mu_p) + \mu_p,$$

where $\tau$ is a parameter controlling the amount of contrast enhancement; $\mu_p$ is the mean of the color distribution; and $\sigma_p$ is the variance of the color distribution.

18. The system of claim 17, wherein the equation is simplified by replacing the variance $\sigma_p$ with a constant.

19. A system, comprising:
a memory; and
a processor coupled to the memory, the processor configured to:
receive a three-dimensional scene, and
render the 3D scene according to a foveated rendering algorithm to generate a foveated image, wherein the foveated rendering algorithm is implemented as a coarse pixel shading (CPS) shader executed by the processor, and wherein the processor is a parallel processing unit, and the CPS shader includes instructions configured to calculate a specular lighting component of a color value for a sample location by:
determining a pixel footprint associated with the sample location;
transforming the pixel footprint into a slope domain region associated with a normal distribution function; and
calculating an expected density of slopes within the slope domain region.

20. A non-transitory, computer-readable storage medium storing instructions that, when executed by a processor, cause the processor to perform steps comprising:
receiving a three-dimensional scene;
rendering the 3D scene according to a foveated rendering algorithm to generate a foveated image; and
filtering the foveated image using a contrast-enhancing filter to generate a filtered foveated image, wherein the contrast-enhancing filter comprises, for each pixel p in the foveated image, calculating a contrast-enhanced color $C'_p$ based on a variance of a color distribution of at least two color values in a kernel window centered on the pixel p, and a difference between the color value, $C_p$, of the pixel p, and a mean of the color distribution of the at least two color values in the kernel window.

* * * * *